United States Patent
Pelka et al.

(10) Patent No.: US 9,507,204 B2
(45) Date of Patent: Nov. 29, 2016

(54) BAFFLED MICRO-OPTICAL ELEMENTS FOR THIN LIQUID CRYSTAL DISPLAY BACKLIGHT UNITS

(71) Applicant: Seoul Semiconductor Co., Ltd., Ansan-si (KR)

(72) Inventors: David G Pelka, Los Angeles, CA (US); Meg Tidd, Arvada, CO (US)

(73) Assignee: Seoul Semiconductor Co., Ltd., Ansan-si (KR)

( * ) Notice: Subject to any disclaimer, the term of this patent is extended or adjusted under 35 U.S.C. 154(b) by 0 days.

(21) Appl. No.: 14/316,497

(22) Filed: Jun. 26, 2014

(65) Prior Publication Data

US 2015/0003044 A1    Jan. 1, 2015

Related U.S. Application Data

(60) Provisional application No. 61/839,596, filed on Jun. 26, 2013.

(51) Int. Cl.
| | |
|---|---|
| *F21V 13/02* | (2006.01) |
| *F21V 3/00* | (2015.01) |
| *F21V 5/00* | (2015.01) |
| *G02F 1/1335* | (2006.01) |

(52) U.S. Cl.
CPC ... *G02F 1/133605* (2013.01); *G02F 1/133603* (2013.01); *G02F 1/133606* (2013.01); *G02F 2001/133607* (2013.01)

(58) Field of Classification Search
CPC .................. G02F 1/133603; G02F 1/133605; G02F 1/133606

USPC ................................... 362/97.1–97.4
See application file for complete search history.

(56) References Cited

U.S. PATENT DOCUMENTS

| | | | |
|---|---|---|---|
| 4,043,636 A | 8/1977 | Eberhardt et al. | |
| 6,007,209 A | 12/1999 | Pelka | |
| 6,697,042 B1 * | 2/2004 | Cohen et al. | 345/102 |

(Continued)

FOREIGN PATENT DOCUMENTS

| | | | |
|---|---|---|---|
| JP | 2010238420 A | * | 10/2010 |
| KR | 10-2009-0108409 | | 10/2009 |

(Continued)

OTHER PUBLICATIONS

Machine English translation of JP 2010238420A to Inoue et al.*

(Continued)

*Primary Examiner* — Donald Raleigh
(74) *Attorney, Agent, or Firm* — H.C. Park & Associates, PLC

(57) ABSTRACT

A light-emitting diode (LED) backlight unit includes a housing, an LED array disposed on a bottom surface of the housing, an optical film stack disposed on the LED array, and a baffled micro-optical element (BMOE) disposed between the LED array and the optical film stack. The thickness of the backlight unit is 12 mm or less, a first portion of light emitted from each LED of the LED array is configured to directly contact the optical film stack and a second portion of light emitting from each LED of the LED array is configured to be reflected off of the BMOE and onto the optical film stack, and the first and second portions of light combine to create surface illuminance on the optical film stack having a uniformity greater than 70%.

14 Claims, 25 Drawing Sheets

(56) References Cited

U.S. PATENT DOCUMENTS

| | | | |
|---|---|---|---|
| 6,932,496 B2 * | 8/2005 | Rizkin et al. | 362/299 |
| 7,348,723 B2 | 3/2008 | Yamaguchi et al. | |
| 7,445,370 B2 | 11/2008 | Ohkawa | |
| 7,473,937 B2 * | 1/2009 | Park et al. | 257/98 |
| 7,621,657 B2 | 11/2009 | Ohkawa | |
| 7,798,679 B2 | 9/2010 | Kokubo et al. | |
| 8,227,969 B2 | 7/2012 | Yamaguchi et al. | |
| 8,328,395 B2 | 12/2012 | Kato et al. | |
| 2006/0138437 A1 | 6/2006 | Huang et al. | |
| 2008/0128725 A1 * | 6/2008 | Hsing Chen et al. | 257/98 |
| 2009/0147513 A1 * | 6/2009 | Kolodin et al. | 362/241 |
| 2012/0087133 A1 | 4/2012 | Markytan et al. | |
| 2012/0162966 A1 * | 6/2012 | Kim et al. | 362/97.1 |
| 2013/0200784 A1 * | 8/2013 | Matsuura et al. | 313/512 |

FOREIGN PATENT DOCUMENTS

| | | |
|---|---|---|
| KR | 10-2011-0041192 | 4/2011 |
| KR | 10-2012-0058928 | 6/2012 |
| KR | 10-2012-0065752 | 6/2012 |

OTHER PUBLICATIONS

Machine English translation of KR 1020120058928 to Seo et al.*
International Search Report issued on Jun. 24, 2014 in international application No. PCT/KR2014/005712.
Written Opinion issued on Jun. 24, 2014 in international application No. PCT/KR2014/005712.

* cited by examiner

Transmittance Measurements for standard LCD Diffuser Material

| Material Characteristics | |
|---|---|
| LED | SSTVLED |
| Reflector around LED | Specular, 85% reflective |
| Cone reflector (LED side) | Specular, 85% reflective |
| Cone reflector (screen side) | Furukawa MC-PET |
| Cone center diffuser | Bayer LC7 |
| PCB/grid reflectors | Furukawa MC-PET |
| Screen diffuser | LCD backlight diffuser |
| BEF prisms in both directions | 3M acrylic BEF film |

BAFFLED MICRO-OPTICAL ELEMENTS FOR THIN LIQUID CRYSTAL DISPLAY BACKLIGHT UNITS

CROSS-REFERENCE TO RELATED APPLICATION

This application claims the benefit of U.S. Provisional Patent Application No. 61/839,596, filed on Jun. 26, 2013, which is hereby incorporated by reference for all purposes as if fully set forth herein.

BACKGROUND

Field

The present invention relates to a backlighting apparatus for direct-view backlight units, particularly for LCD TVs, tablets, notebooks computers, and the like.

Discussion of the Background

Light emitting diodes (LEDs) have now become the preferred light sources for the backlight units (BLUs) of liquid crystal display devices (LCDs). As a consequence of their dramatic increase in efficacy, the number of LEDs required to adequately illuminate BLUs has decreased by a factor of 2 to 3 times over the past year. Also, consumer demand for increasingly thinner LCD TVs mean that there is a need for new optical architectures to allow for the manufacture of these thinner designs and yet still maintain adequate luminance and uniformity to the LCD display panels.

Previous optics for direct-view BLUs included small refractive lenses placed directly over LED light sources, arranged in geometrical arrays, and acting as baffles to redirect the intense light coming from the LEDs. As such, hot spots in the LCD panel were reduced to acceptable levels, with the result that the thickness of the resulting BLU was typically 20-25 mm. Consumer demand for thinner LCD TVs requires that a new optical architecture for BLUs be created to accommodate BLUs of 12 mm thickness or less. Thus, this patent application seeks to overcome the shortcomings of previous patents and applications for BLUs, such as disclosed in U.S. Patent Application Publication No. 2006/0138437A1, U.S. Pat. Nos. 7,348,723, 7,445,370, 7,621,657, 7,798,679, 8,227,969, and 8,328,395, and baffled LED elements such as disclosed in U.S. Pat. No. 6,007,209.

A typical flat-panel display may utilize an LCD to display information. LCDs, which allow the display of alphanumeric, graphic, or other information, comprise a medium whose transmittance changes in response to the application of electrical potential across the medium. LCDs may be viewed even in an otherwise dark environment, by applying illumination uniformly to their rear face. An exemplary backlighting apparatus for an LCD is disclosed in U.S. Pat. No. 4,043,636.

It may be desirable for a backlight for LCDs, such as those found in LCD TVs, to have certain attributes. Notebook computers and tablets are often used during travel and in areas with little light such as trains and airplanes. Hence, it may be desirable that LCDs have an acceptable level of brightness and uniformity so that the user can easily read the information on the display.

Furthermore, software applications that are used on notebook computers, tablets, and LCD TVs usually require color images. Hence the display may have spectral content that is compatible with the colors displayed on the LCD. It may also be desirable that the light source from the monitor be compact so that it will not significantly increase the size and weight of the notebook computer, tablet, or LCD TV. Many LCD TVs are currently made in a 16×9 format, and the thinness of the display may be a critical factor to its purchase by its end-user. Most LCD TV backlight units now require a total thickness of 25 mm or less, and most recently, less than 13 mm in thickness.

Previously, the ultra-thin backlights were constructed using a 3-4 mm thick acrylic sheet, with the LEDs being placed along one edge of the sheet, to couple the light from the LEDs into a plastic waveguide and conduct the light throughout the acrylic sheet using total internal reflection (TIR). The light was then ejected by using an out-coupling array of micro-dots or micro-lenses that disrupt the TIR and allow the light to be uniformly extracted to the back surface of the LCD display. The shortcoming of this method is that large acrylic sheets may be expensive and relatively heavy.

To make the backlight units less costly and lighter, manufacturers have turned to so-called direct view backlights. Here, the large acrylic sheet is replaced by an array of small, light, and inexpensive lenses that spread the light out over the surface of the backlight unit, such that it has sufficient illuminance and uniformity. However, as the thickness of the backlight unit decreases from 25 mm to the 11-12 mm range, the refractive optical principles upon which theses lenses are based may cease to yield acceptable uniformity. Thus, there is a need to create a new optical paradigm that will accommodate this 11-12 mm thick backlight requirement and still allow for the reductions in cost and weight, while maintaining good spatial uniformity.

U.S. Pat. No. 6,007,209 discloses baffling light coming directly from an LED to an LCD screen, such that LEDs could be arranged into a planar array of sources and then be effectively used as a BLU for an LCD display. At the time this patent issued, LEDs were not very efficient or powerful, but in the succeeding 15 years white LEDs have gone from an efficacy of 5 lumens/Watt, to more than 200 lumens/Watt. As a consequence, the baffling technology that shields the LED from creating a hot spot in the LCD display has to be correspondingly much better at hiding and distributing the light from the LED array so as to maintain excellent uniformity and an acceptable value of illuminance. Previous lens baffling elements such as those taught in U.S. Pat. Nos. 7,348,723, 7,445,370, 7,621,657, 7,798,679, 8,227,969, 8,328,395 must be improved upon to meet these new thinner BLU requirements.

To understand the shortcomings of the previous technologies in moving to these very thin BLU dimensions, we must examine a little recognized optical feature called Fresnel reflections. Over two hundred years ago, Augustin Fresnel showed that when light went from one material with a certain index of refraction to a second material with a different index of refraction, a certain fraction of the light beam would be transmitted and a certain part of the light beam would be reflected. Many direct-view BLUs employ baffles between the LED and LCD display screen that consists of an array of small refractive lenses, such as disclosed in U.S. Pat. No. 7,798,679.

As one moves to increasingly thinner BLUs, the light directed laterally may suffer Fresnel reflections from the lens/air interface, which are subsequently sent downward to the printed circuit board (PCB), which is may be white, and as a result retro-reflects that light directly onto the LCD screen causing non-uniformities (usually evidenced as bright circles from the rotational symmetry of the lens). Imprinting a faceted bottom surface has been shown to ameliorate this effect somewhat, but it increasingly becomes more of a problem for keeping good screen uniformity as the distance between the baffling lens and the surface of the LCD screen shrinks to distances of approximately 10 mm.

SUMMARY

Exemplary embodiments of the present disclosure provide baffled micro-optical elements placed over an array of LEDs, with all of the LEDs being placed directly beneath the LCD display (so-called direct-view BLU).

Exemplary embodiments of the present disclosure also provide optical surfaces that dispatch the light from LED sources using primarily reflection, thus avoiding Fresnel reflections, which result from relying on refraction, such that good uniformity and illuminance is delivered by the LED backlight apparatus to the LCD screen.

Exemplary embodiments of the present disclosure also provide a baffled micro-optical element top-most surface characterized by a diffuse reflective coating that has a diffuse reflectivity of at least 90+%. The vertical reflecting surfaces of the micro-optical elements are obtained by using prescriptive specular reflecting surfaces coated with, for example, sputtered aluminum or silver. Alternately, these surfaces can be made reflective using total internal reflection (TIR) properties of a lens optic.

Exemplary embodiments of the present disclosure also provide baffled cone reflectors having a height on the order of 5 mm or smaller, and in some instances there may be a hole in the cone extending from the surface of the LED to the top surface of the cone reflector.

Exemplary embodiments of the present disclosure also provide an LED surrounded by a cup reflector whose prescription is closely coordinated with the cone reflector to yield good uniformity and illuminance. The cup reflector is configured to gather up the light that would ordinarily be emitted from the LED source in the lateral direction and make sure that this light does not hit the LCD screen in an unguided fashion, thus destroying the uniformity. Rather, this cup reflector ensures that substantially all the light leaving the LED must first strike the cone reflector, whereupon the light will be prescriptively reflected to the white bottom floor of the BLU, which itself may have a diffuse reflectivity in excess of 96%.

Exemplary embodiments of the present disclosure relate to localized unit cells, in which after a certain spatial distance away from the LED source, a circumferential ledge is created. This circumferential bump or ledge is formed from highly diffusive reflecting material (96+%) intended to scatter light emitted laterally from the cone reflector and send that light so that it is incident on the LCD display and adds to the overall uniformity and optical efficiency of the display. By superimposing some number of these unit cells, each of which has outstanding local uniformity, it is possible to create a large BLU for LCD TVs.

Additional features of the disclosure will be set forth in the description which follows, and in part will be apparent from the description, or may be learned by practice of the invention.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this specification, illustrate exemplary embodiments of the disclosure, and together with the description serve to explain the principles of the disclosure.

DETAILED DESCRIPTION OF THE ILLUSTRATED EMBODIMENTS

Figure 1:
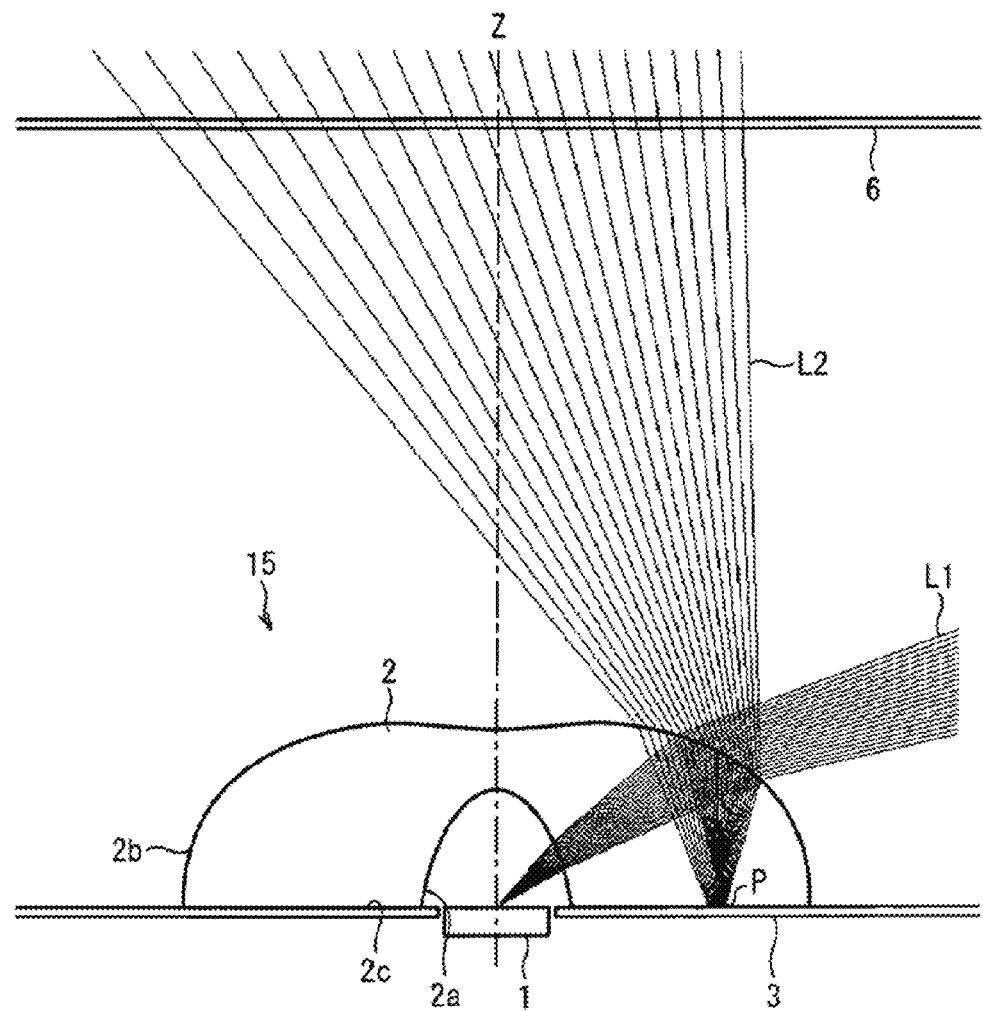
FIG. 1 is a cross-sectional view of a baffled micro-optical element showing Fresnel reflections off of a PCB and retro-reflections to an LCD screen according to the related art.

The present disclosure is described more fully hereinafter with reference to the accompanying drawings, in which exemplary embodiments of the disclosure are shown. This disclosure may, however, be embodied in many different forms and should not be construed as limited to the exemplary embodiments set forth herein. Rather, these exemplary embodiments are provided so that this disclosure is thorough, and will fully convey the scope of the disclosure to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

FIG. 1 shows an optical element 15 of the related art. Here, the optical element includes a lens 2 is situated over an LED light source 1 and receives light from the LED light source 1 hemi-spherically. FIG. 1 shows light that is emitted from the light source 1 toward an inner surface 2a of the lens 2 at 45 degrees as light beam L1, and suffers Fresnel reflections at an outer surface 2b of the lens 2. Light beam L1 is reflected towards the printed circuit board 3 at point P at the bottom surface 2c of the lens 2, where it is then reflected upward, as light beam L2, to the optical film stack 6, where it causes significant non-uniformities in the illuminance pattern for an LCD display (not shown). This pattern creates bright circles in the LCD image because of the rotational symmetry of these types of refractive lenses.

Figure 2:
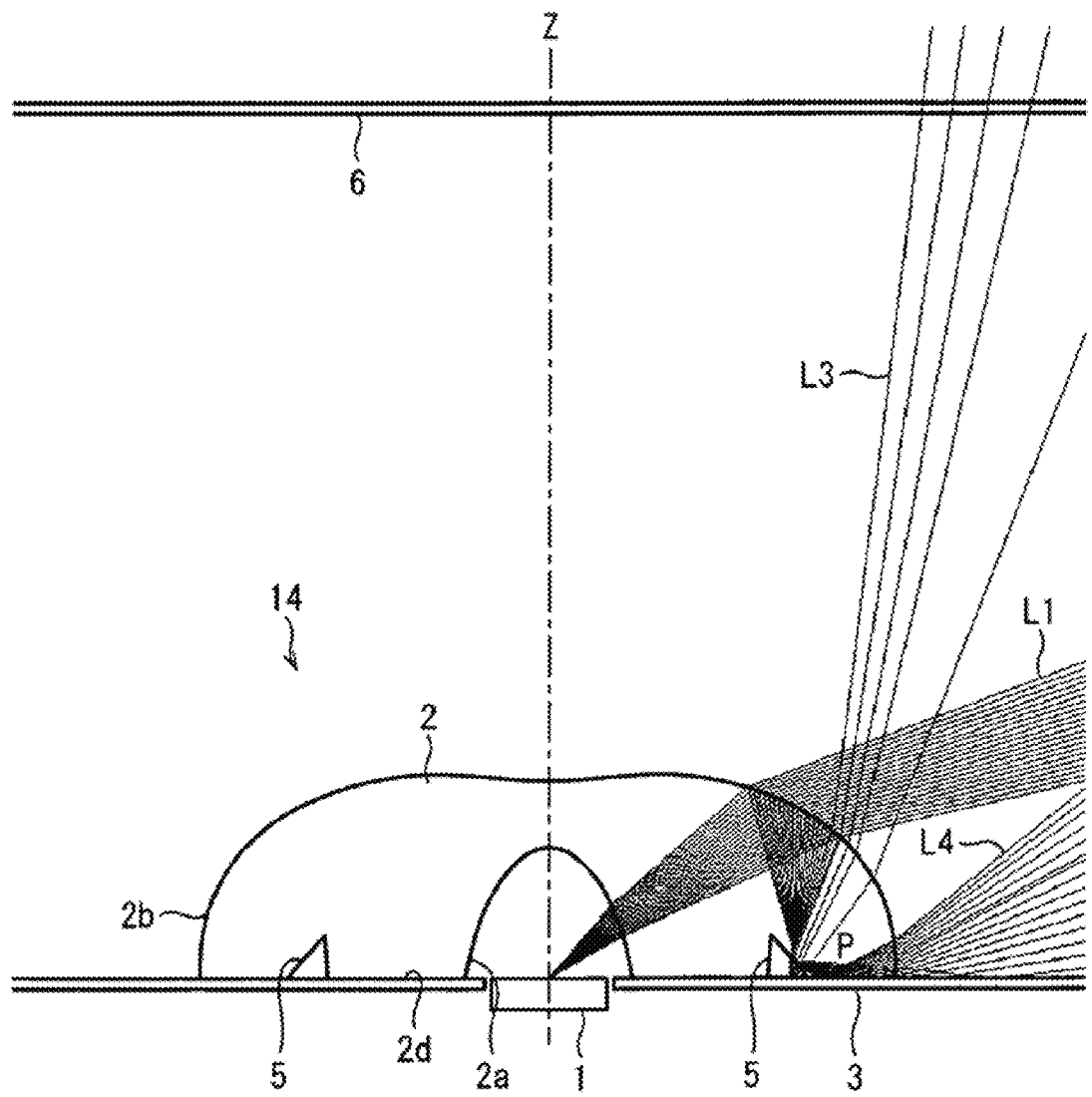
FIG. 2 is a cross-sectional view of a baffled micro-optical element showing a faceted bottom structure according to the related art.

FIG. 2 an optical element 14 similar to that of FIG. 1, which also includes a faceted structure 5 imprinted into the bottom 2c of an injection molded lens 2, to lessen the bright ring effect noted above. Random roughening of the bottom surface 2d works as well, but all cures seek to randomize the direction of the radiation from the Fresnel reflection, and in this way attempt to ameliorate its negative effect. This becomes increasingly less effective as the thickness of the optical element 14 is deceased from 25 mm down to about 10 mm, as the distance this randomization process has to take place is greatly reduced and correspondingly its effectiveness as a solution tends to zero as the thickness becomes smaller.

Figure 3:
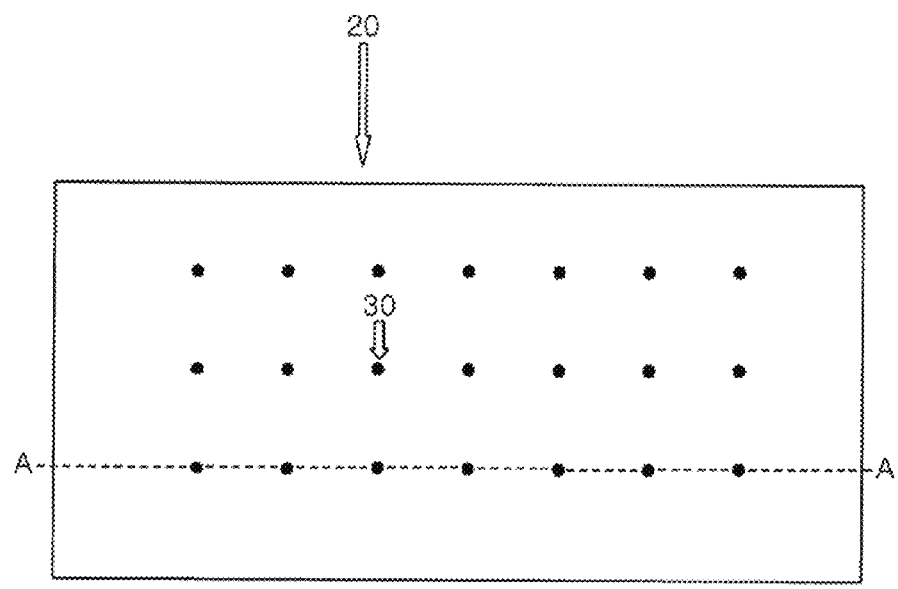
FIG. 3 shows a plan view of an LED backlight unit (BLU) according to an exemplary embodiment of the present disclosure, with an optical film stack omitted.

FIG. 3 shows a plan drawing of a 16×9 LED backlight unit (BLU) 20 for an LCD display, with an optical film stack removed for clarity of presentation. LEDs 30 disposed in an array protrude through a white diffusive highly reflecting (95%+) display bottom, which supplies the light for the LED BLU 20. Although the LED spacing in the vertical and horizontal directions appears to be approximately equal, as LEDs increase their efficacy to 200 lumens/Watt from 100 lumens/Watt, the number of LEDs required to backlight an LCD will decrease dramatically. As a result, baffled micro-optical elements for LED BLUs may be asymmetric (i.e., throwing more light in the long direction as opposed to the short direction) in order to accommodate the 16×9 format. In addition, the LED BLU 20 may have an overall thickness of approximately 10 mm or less.

Figure 4:
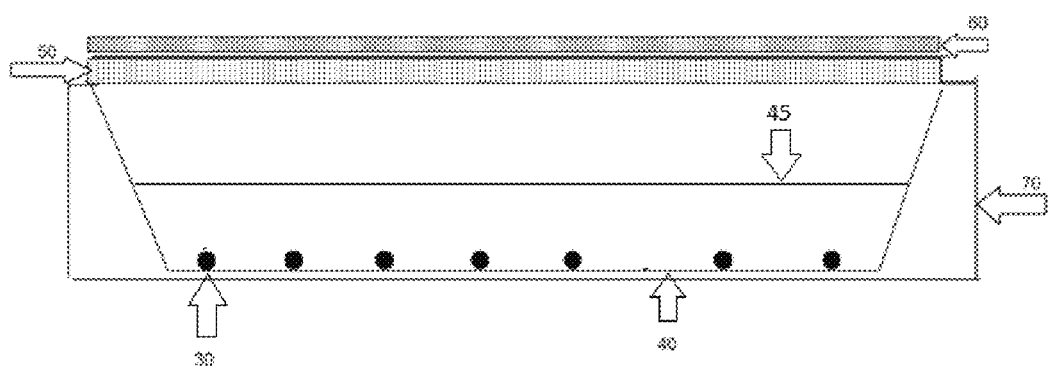
FIG. 4 is a cross-sectional view of the LED backlight unit of FIG. 3 taken along line A-A, and showing an optical film stack disposed thereon.

FIG. 4 shows a cross-sectional view of the LED BLU 20 of FIG. 3, with the optical film stack now shown in place. An exterior housing 70 may be made from lightweight aluminum or plastic materials, while the bottom 40 of the housing 70, as well as inclined sidewalls of the housing 70, may be made of a white diffusive material. The sidewalls may be inclined at a 45° angle. The white diffusive material may have a diffuse reflectivity in excess of 95%. The LEDs 30 act as the light sources for the LED BLU 20, and a diffuser 50 and a set of optical films 60, which may include a prism film as well as a polarization recycling film, are disposed above the LEDs 30.

The LED BLU 20 also includes a baffled micro-optical element disposed on the LEDs 30 at the bottom 40 of the housing 70. The baffled micro-optical element may be in the form of an optical sheet 45 that includes conical reflectors disposed above the LEDs 30. Alternatively, individual mounting structures or vertical wall mounts for each conical reflector may be placed around each LED. According to an exemplary embodiment of the present disclosure, the baffled micro-optical element is situated over each of the LEDs 30. As such, some of the light emitted by the LEDs 30 travels directly to the surface of the diffuser 50, while some of the emitted light is reflected by the baffled micro-optical element toward the bottom 40 of the LED BLU 20, where it is subsequently reflected to the diffuser 50. As such, all of the above emitted light is superimposed and combined to create a surface illuminance on the diffuser 50 with a uniformity in excess of 70%.

Figure 5:
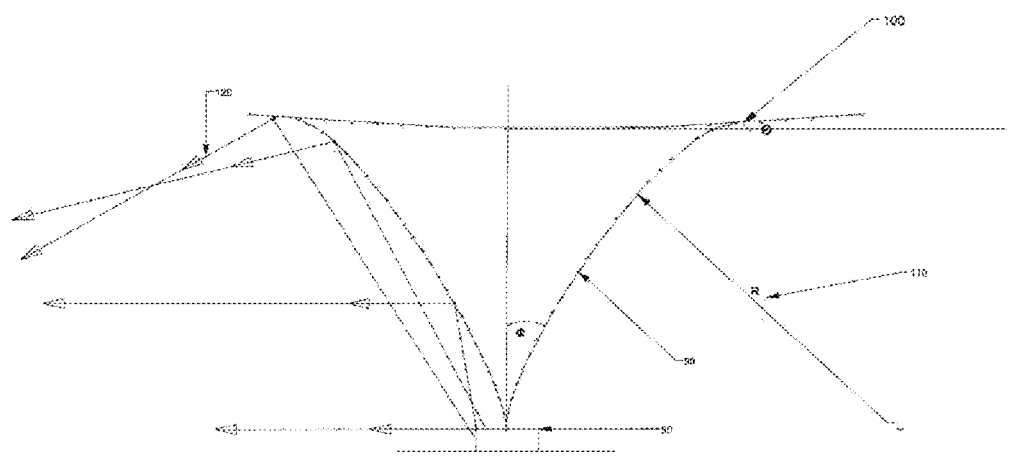
FIG. 5 is a schematic representation of a baffled micro-optical element including a conical reflector according to an exemplary embodiment of the present disclosure.

FIG. 5 shows a cross-sectional diagram of a conical reflector 90, according to an exemplary embodiment of the present disclosure. Examining FIG. 5, we see that the conical reflector 90 includes an initial cone angle φ, a radius of curvature R, and an angle at which the top surface of the baffled micro-optical element makes with the horizontal axis θ. Note the horizontal axis θ can take on both positive as well as negative values depending on how much of the light leaving the LED one desires to directly impinge upon the diffuser 50. Also, the cone angle φ may change as one changes in azimuth to accommodate asymmetric light distributions. This also applies to the spatial extent of this opaque baffle surface.

The inner surface of the conical reflector 90 may be a highly specular reflecting surface of the type produced by an aluminized reflective coating, or total internal reflecting (TIR) surfaces using the change in index of refraction of the interior dielectric material, such as a transparent plastic, from that of air. A top surface 100 of the optical sheet 45 may be a white diffusive reflective surface with diffuse reflectivity in the range of 95 to 99%. The radius of curvature 110 may not be a constant radius of curvature but rather one that may easily change or may be non-arc based curvature, as a function of the light distribution required on the bottom 40 of the LED BLU 20.

Figure 6:
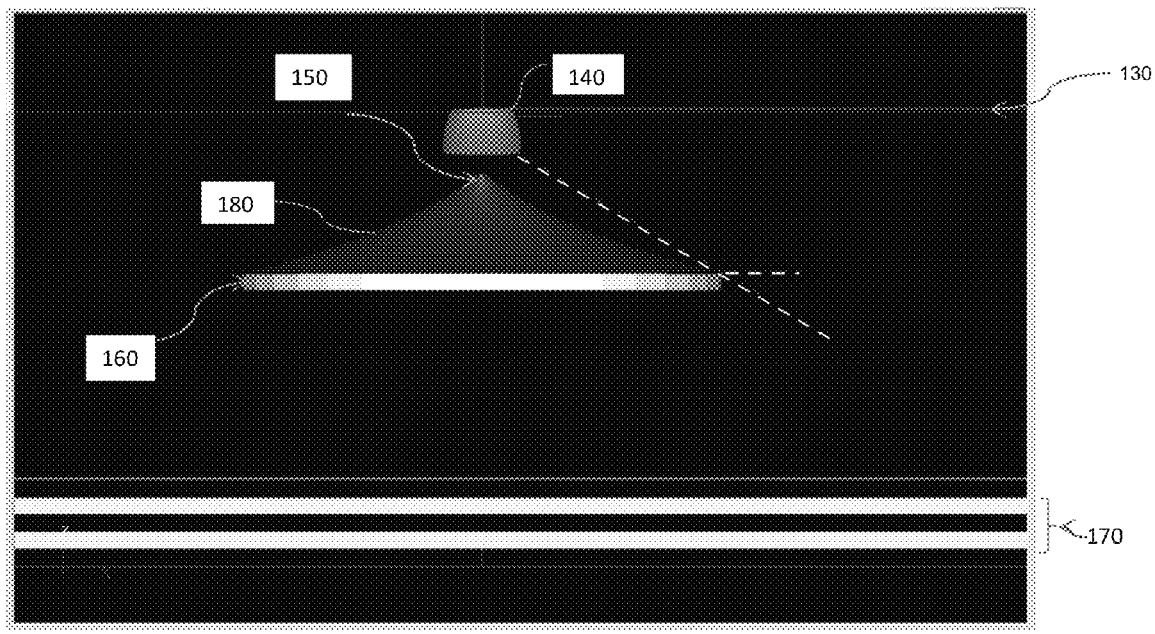
FIG. 6 shows a side view of the conical reflector according to the exemplary embodiment of FIG. 5.

FIG. 6 shows a side view of a portion of an LED backlight unit according to an exemplary embodiment of the present disclosure. The LED backlight unit includes a conical reflector 180 and an LED-enclosing reflector 140 disposed on a PCB 130. The reflector 140 ensures that light leaving an enclosed LED is directed to the conical reflector 180 (shown by the diagonal dashed line) to thereby create a desired radiation emission pattern as a function of the power of the LED and the LCD panel geometry. A hole 150 is formed in the tip of the conical reflector 180 to reduce decrement in illuminance on the LCD screen by the cone reflector's shadow. The conical reflector 180 includes a diffuse reflecting front surface 160. The conical reflector 180 has a specular reflecting back surface, and the diffuse reflecting front surface 160 may be a white reflector. The hole 150 is about 0.5 mm in diameter, and the cone profile is about 0.5 mm thick. The conical reflector 180 is spaced slightly less than 5 mm from the PCB 130, as measured from the horizontal dashed line.

The LED backlight unit also includes an optical film stack 170 including, in sequence, a diffuser, brightness enhancing films (BEFs), and a polarization reflecting film, which may replace one of the BEF films. The optical film stack 170 may condition the light from a diffuse reflecting cavity 105 such that it obtains excellent uniformity as well as a restriction in the field of view that is optimized for the viewer of the LCD display. The PCB 130 is disposed about 7 mm beneath the top surface of the conical reflector 180, and the inside of the optical film stack 170 is about 11.5 mm away from the PCB 130.

Figure 7:
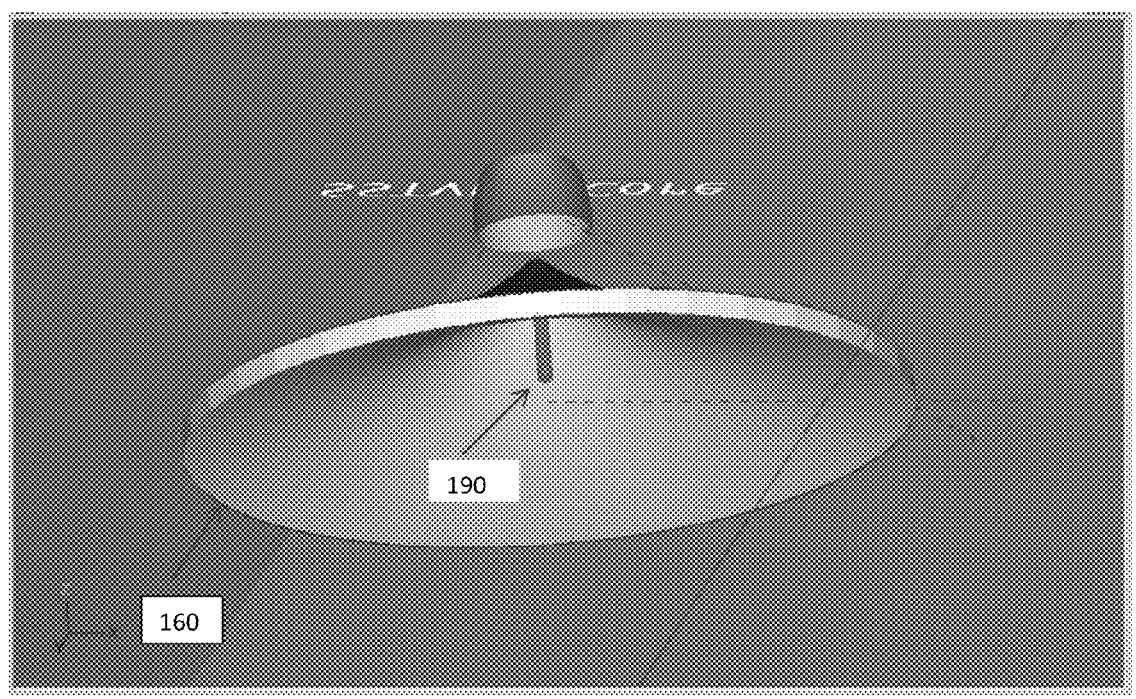
FIG. 7 shows the conical reflector according to the exemplary embodiment of FIG. 5.

According to the present exemplary embodiment, the conical reflector 180 shown in FIG. 7 contains the hole 150 at the tip thereof, such that light from the surface of the LED may transverse up the length of the interior of the conical reflector 180 to a semi-opaque top surface such that the top most portion of the cone may be partially illuminated by the light coming up through the hole. This hole 150 may have a center diffuser 190 placed within it. In a totally internally reflecting (TIR) solution according to another exemplary embodiment, the hole in the cone may be replaced by a small negative lens over the LED. The center diffuser 190 and white front surface 160 of the conical reflector 180 help fill in the light directly in front of each optical element. The center diffuser 190 and white front surface 160 allow more light to appear at the center of the illuminance pattern and contribute to the uniformity of light incident on the optical film stack 170.

Figure 8:
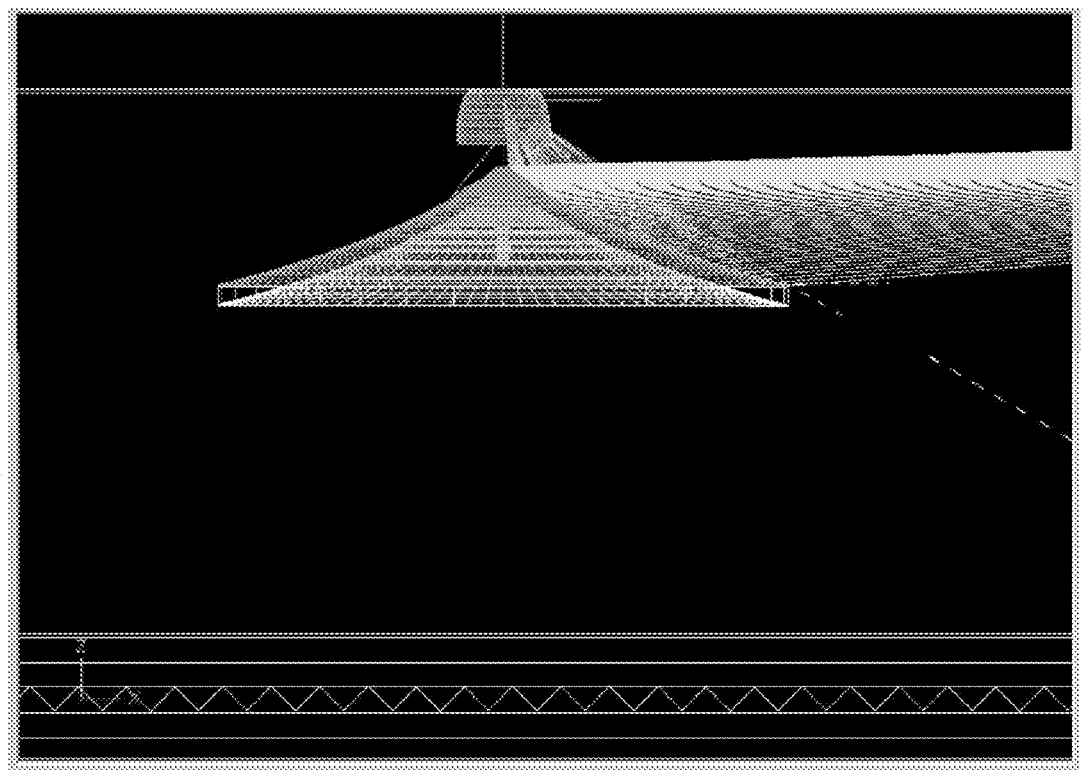
FIGS. 8 and 9 show an extending direction of light away from the conical reflector of FIG. 5.
Figure 9:
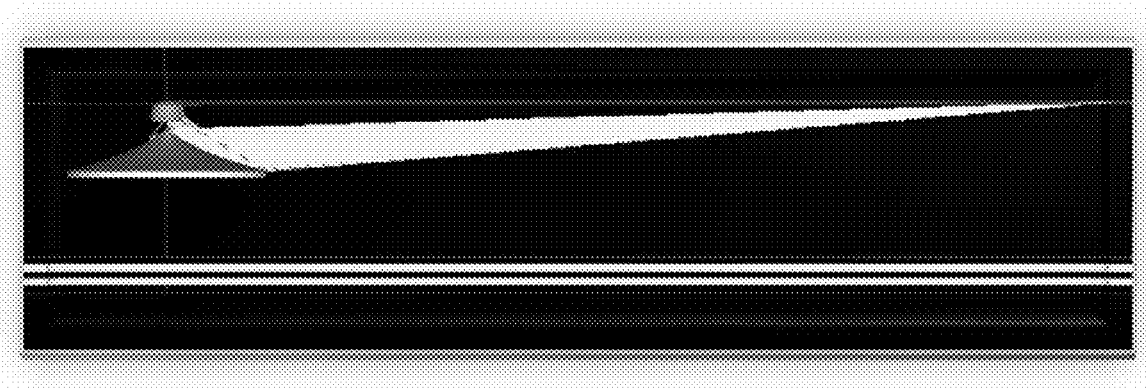

As shown in FIGS. 8 and 9, the lines extending away from the conical reflector 180 show the way the conical reflector 180 is aimed. The reflector 140 around the base of the LED cross-aims the light onto the conical reflector 180. The conical reflector 180 aims the light onto the PCB 130, about halfway to an adjacent LED.

Figure 10:
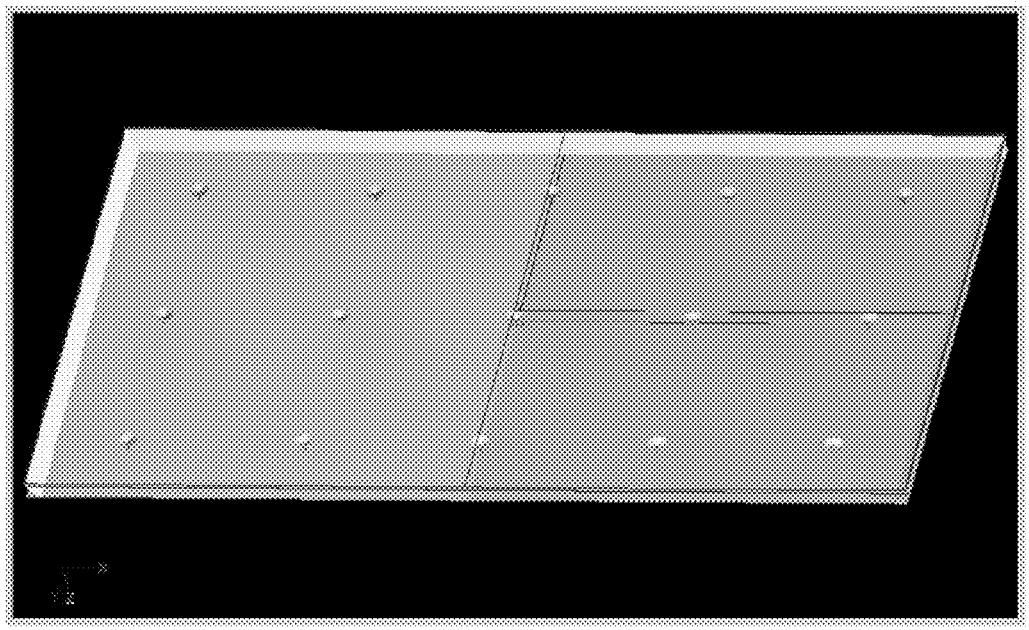
FIG. 10 shows a plan view of an LED backlight unit including the conical reflector of FIG. 5, according to an exemplary embodiment of the present disclosure.

FIG. 10 shows a plan view of an optical sheet 45 of an LED backlight unit including the conical reflectors 180, according to an exemplary embodiment of the present disclosure. Conical reflectors as described above with respect to FIGS. 5-9 are positioned above the LEDs, with the cone tips facing towards the LEDs. Similar to FIG. 3, the optical film stack is omitted from the present view.

Figure 11:
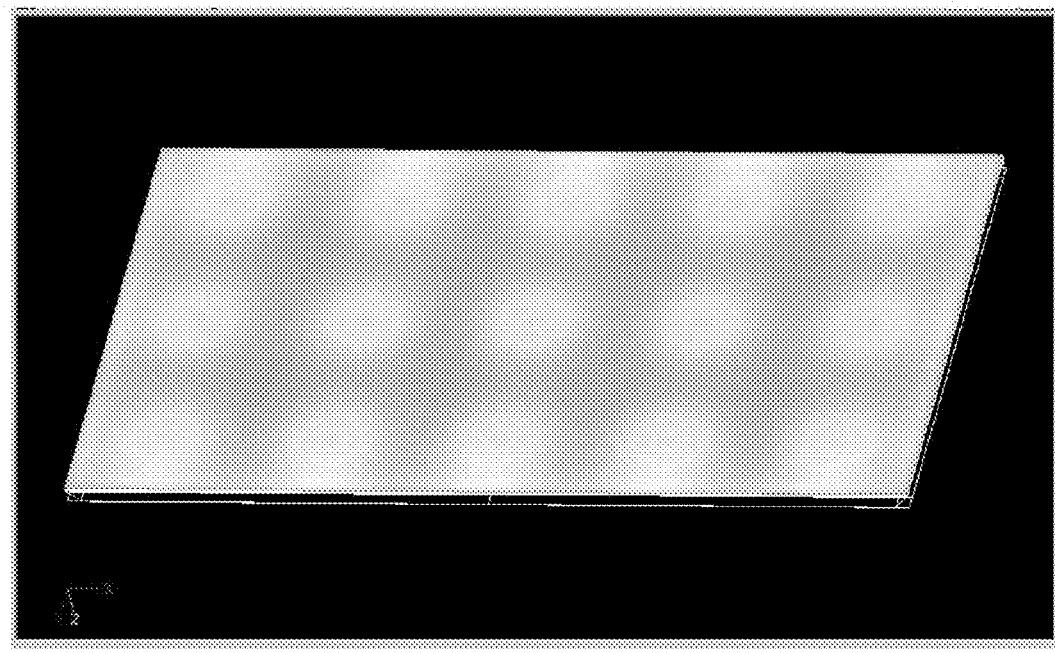
FIG. 11 shows a light pattern on the outside of the LED backlight unit of FIG. 10 with an optical film stack disposed thereon.
Figure 12:
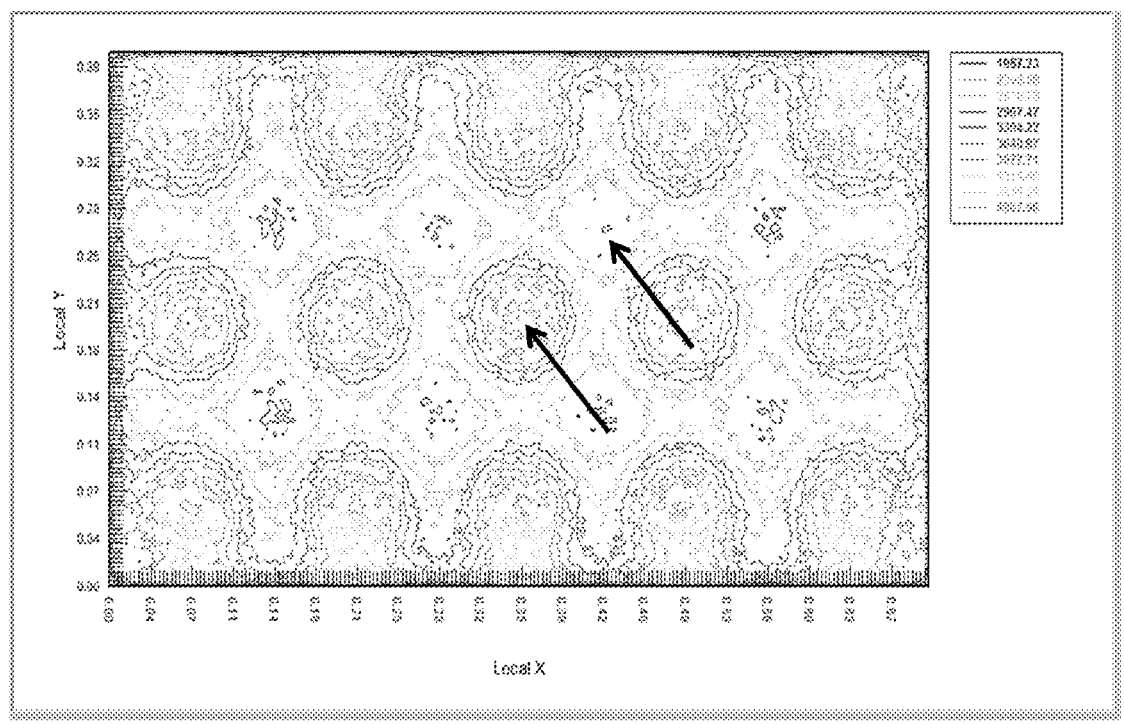
FIG. 12 shows the light pattern of FIG. 11 as a contour illuminance plot.

FIG. 11 shows a light pattern on the outside of the LED backlight unit according to the present exemplary embodiment, when the optical film stack is in place. Illuminance is greater in whiter portions of the light pattern. FIG. 12 shows the light pattern of FIG. 11 as a contour illuminance plot. Here, illuminance is greatest near the left-hand arrow (in the center of the circle), while illuminance is least near the right-hand arrow. Accordingly, the ratio of maximum to minimum illuminance in the present exemplary embodiment ranges from 1.7:1 and 2.0:1. That is, uniformity of illuminance ranges from 50% to 59% according to the present exemplary embodiment (uniformity being defined as min/max×100%).

Figure 13:
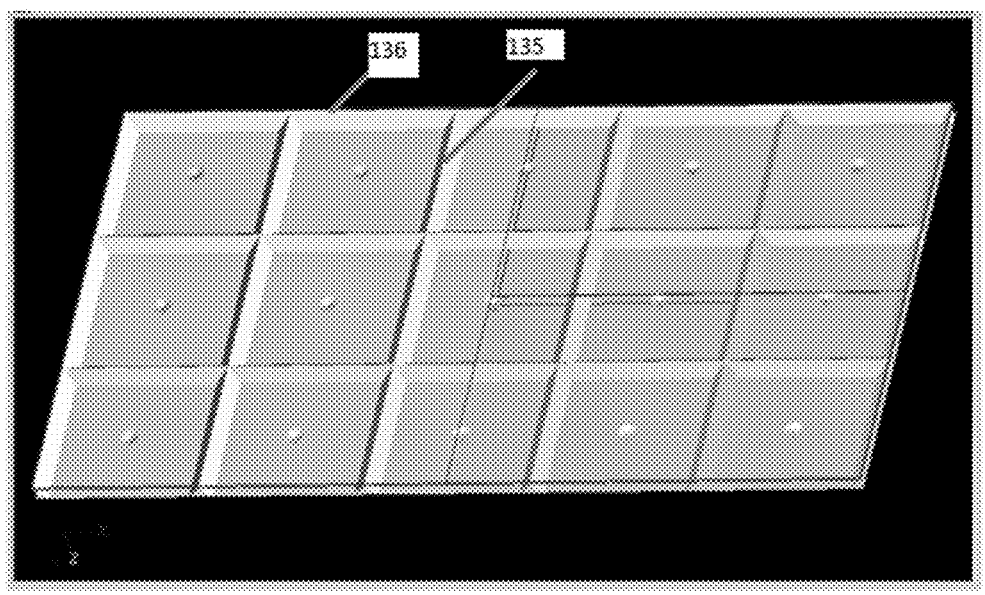
FIG. 13 shows a plan view of an LED backlight unit including the conical reflector of FIG. 5 and a tilted edge grid, according to an exemplary embodiment of the present disclosure.

FIG. 13 shows a plan view of an optical sheet including the conical reflectors 180 of FIG. 6 and tilted edge grid 135, according to an exemplary embodiment of the present disclosure. According to the present exemplary embodiment, high angle spill light that would otherwise go more than halfway towards an adjacent LED can be redirected towards the optical film stack by the edge grid 135. Surfaces of the edge grid 135 may be angled at 45° as shown in FIG. 13, and may be connected to form unit cells 136. These unit cells 136 can be replicated in both the vertical and horizontal directions to enable backlight units of any size to be fabricated with excellent uniformity. This can be achieved using a grid of reflectors between the LEDs.

Figure 14:
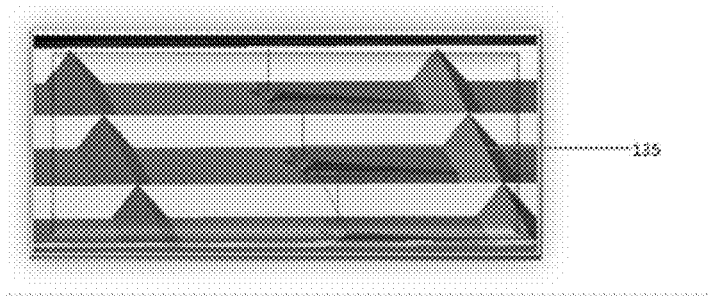
FIG. 14 shows an inset plan view of the LED backlight unit of FIG. 13.

FIG. 14 shows an inset plan view of the LED backlight unit of FIG. 13. Conical reflectors as described above with respect to FIGS. 5-9 are positioned above the LEDs, with the cone tip facing towards the LED. Light as it is reflected off of the conical reflectors is shown, and contacts the edges 135 of the edge grid 135. The edge grid 135 surrounding the conical reflectors is shown as a pyramidal shape, with the base of the pyramid on the bottom of the LED backlight unit. Similar to FIG. 3, the optical film stack is omitted from FIGS. 13 and 14.

Figure 15:
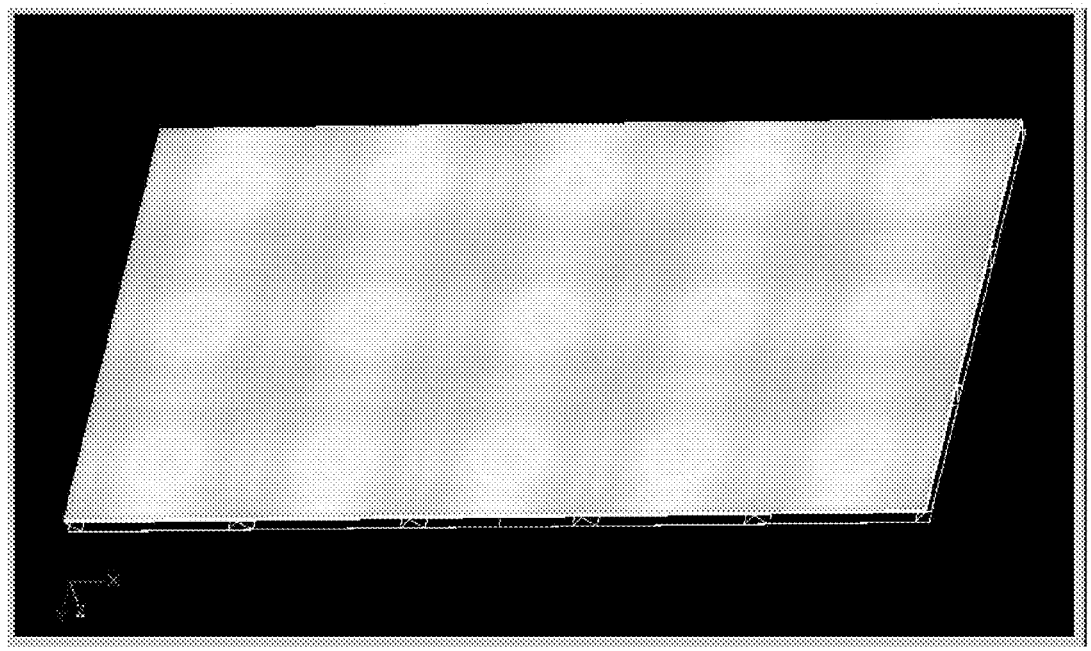
FIG. 15 shows a light pattern on the outside of the LED backlight unit of FIG. 13 with an optical film stack disposed thereon.
Figure 16:
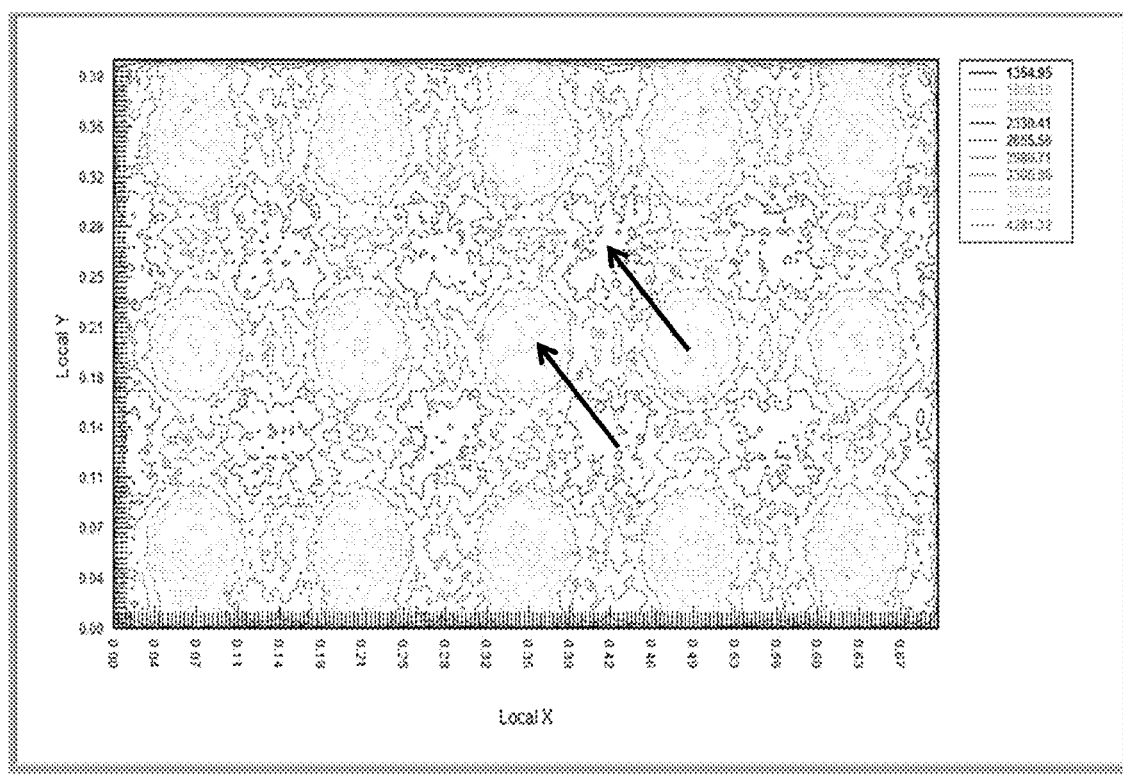
FIG. 16 shows the light pattern of FIG. 15 as a contour illuminance plot.

FIG. 15 shows a light pattern on the outside of the LED backlight unit according to the present exemplary embodiment when the optical film stack is in place. FIG. 16 shows the light pattern of FIG. 15 as a contour illuminance plot. Here, illuminance is greatest near the left-hand arrow (in the center of the circle), while illuminance is least near the right-hand arrow. Accordingly, the ratio of minimum to maximum illuminance in the present exemplary embodiment ranges from 1.3:1 and 1.7:1, or about 59 to 77% uniformity.

Figure 17:
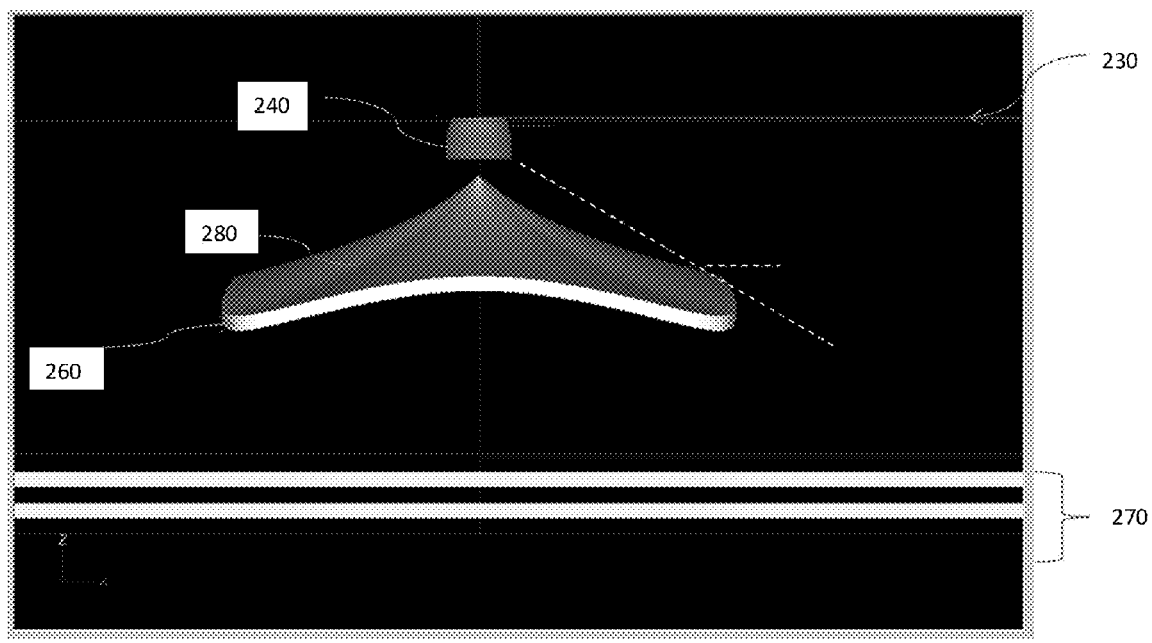
FIG. 17 shows a squared cone reflector according to an exemplary embodiment of the present disclosure.

FIG. 17 shows a portion of an LED backlight unit according to an exemplary embodiment of the present disclosure. The LED backlight unit includes a squared cone reflector 280 having a double reflective geometry and an LED-enclosing reflector 240 disposed on a PCB 230. The reflector 240 ensures that light leaving an enclosed LED is directed to the squared cone reflector 280 (shown by the diagonal dashed line) to thereby create a desired radiation emission pattern as a function of the power of the LED and the LCD panel geometry. The squared cone reflector 280 also includes a diffuse reflecting cone front surface 260. The squared cone reflector 280 has a specular reflecting back surface, and the reflecting front surface 260 may be a white reflector. The squared cone profile is about 0.5 mm thick.

The LED backlight unit also includes an optical film stack 270 including, in sequence, a diffuser, brightness enhancing films (BEFs), and a polarization reflecting film, which may replace one of the BEF films. The optical film stack 270 may condition the light from a diffuse reflecting cavity 205 such that it obtains excellent uniformity as well as a restriction in the field of view that is optimized for the viewer of the LCD display. The PCB 230 is disposed about 7 mm beneath the top surface of the squared cone reflector 280, while the inside of the optical film stack 270 is about 11.5 mm above the PCB 230.

Figure 18:
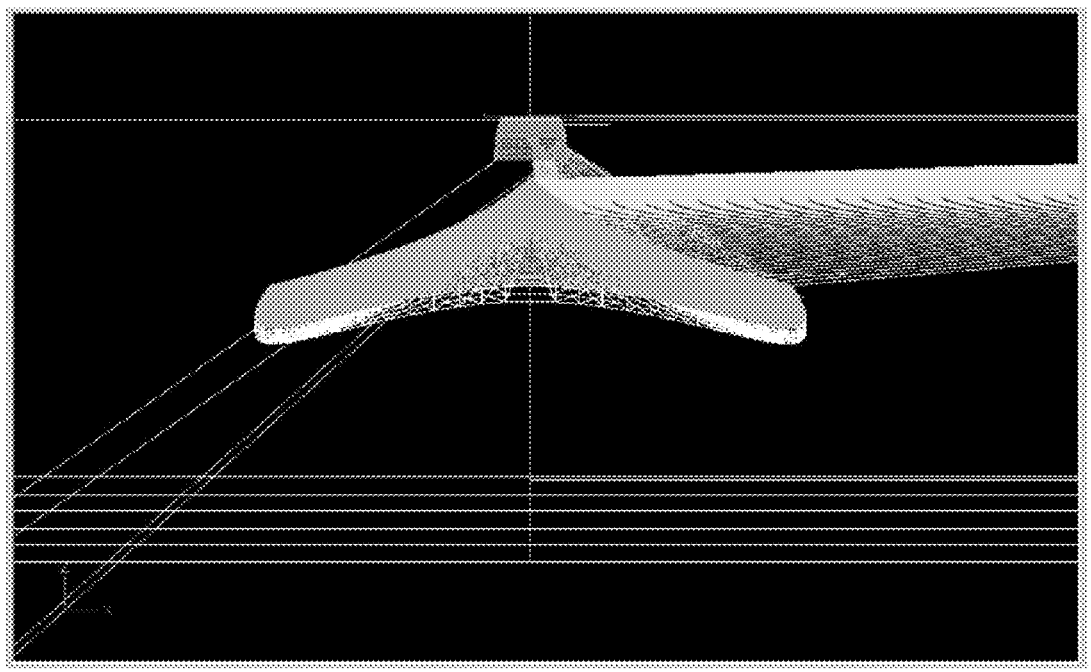
FIGS. 18 and 19 show an extending direction of light away from the squared cone reflector of FIG. 17.
Figure 19:
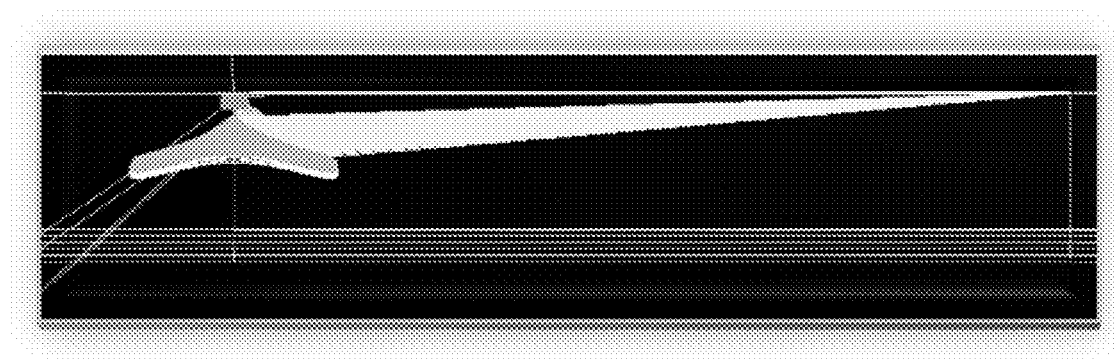

As shown in FIGS. 18 and 19, the lines extending away from the squared cone reflector 280 show the way the squared cone reflector 280 is aimed. The reflector 240 around the base of the LED cross-aims the light onto the squared cone reflector 280. The squared cone reflector 280 aims the light onto the PCB 230, about halfway to an adjacent LED.

Figure 20:
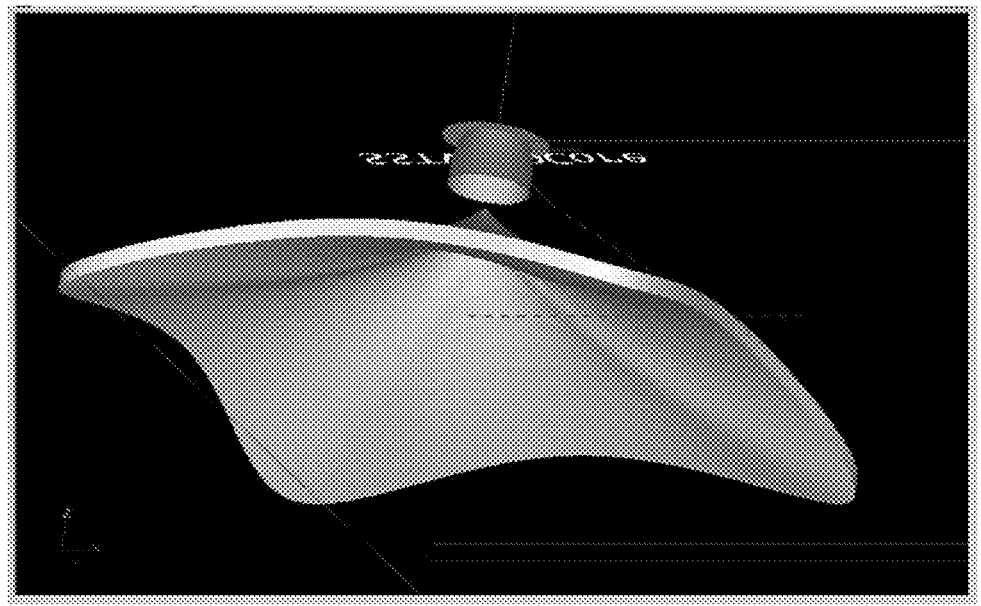
FIG. 20 shows the squared cone reflector according to the exemplary embodiment of FIG. 17.
Figure 21:
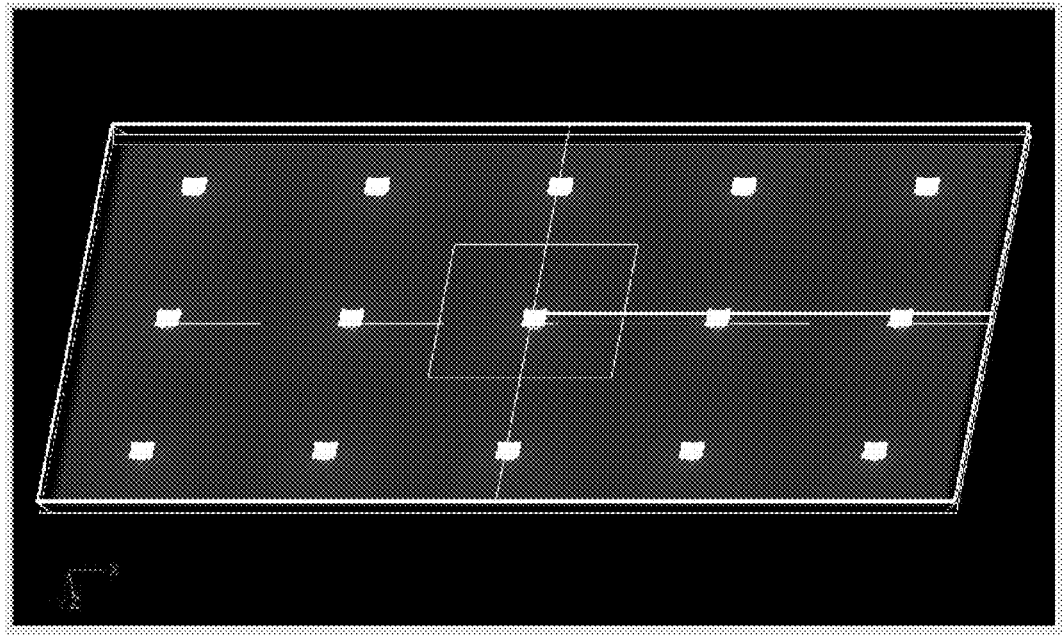
FIG. 21 shows a plan view of an LED backlight unit including the squared cone reflector of FIG. 17, according to an exemplary embodiment of the present disclosure.

According to the present exemplary embodiment, the squared cone reflector 280 shown in FIG. 20 creates a light pattern that is square. The reflector shape peaks in the center, using a 0.1 mm fillet radius. The white front surface 260 of the squared cone reflector 280 helps fill in the light directly in front of each optical element FIG. 21 shows a plan view of an optical sheet 45 of an LED backlight unit including the squared cone reflectors 280, according to an exemplary embodiment of the present disclosure. Squared cone reflectors as described above with respect to FIGS. 17-20 are positioned above the LEDs, with the cone tips facing towards the LEDs. Similar to FIG. 3, the optical film stack is omitted from the present view.

Figure 22:
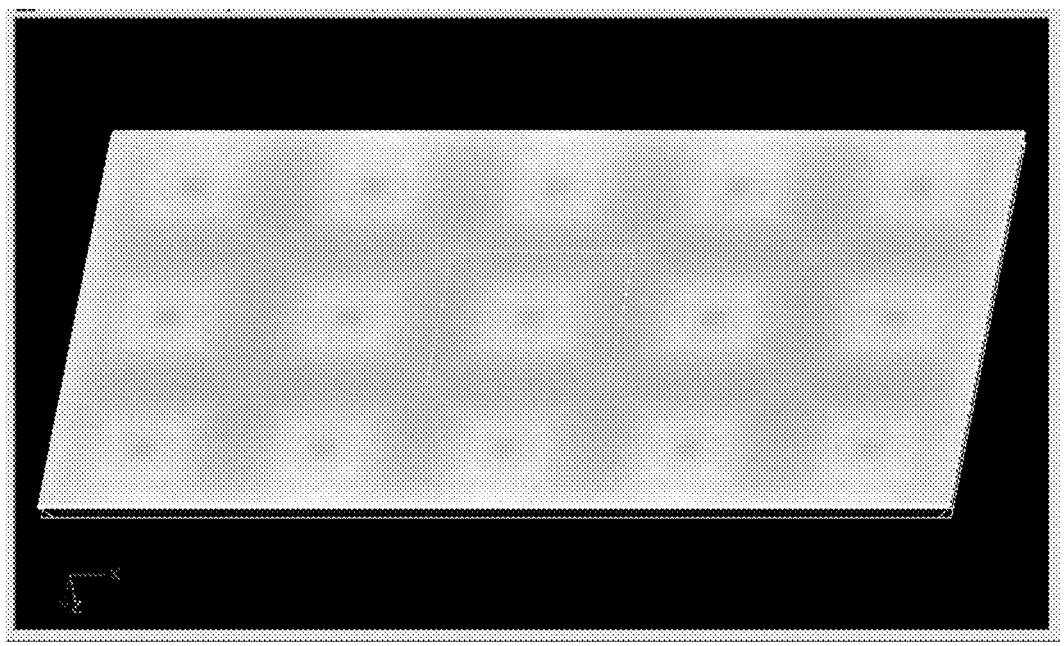
FIG. 22 shows a light pattern on the outside of the LED backlight unit of FIG. 21 with an optical film stack disposed thereon.
Figure 23:
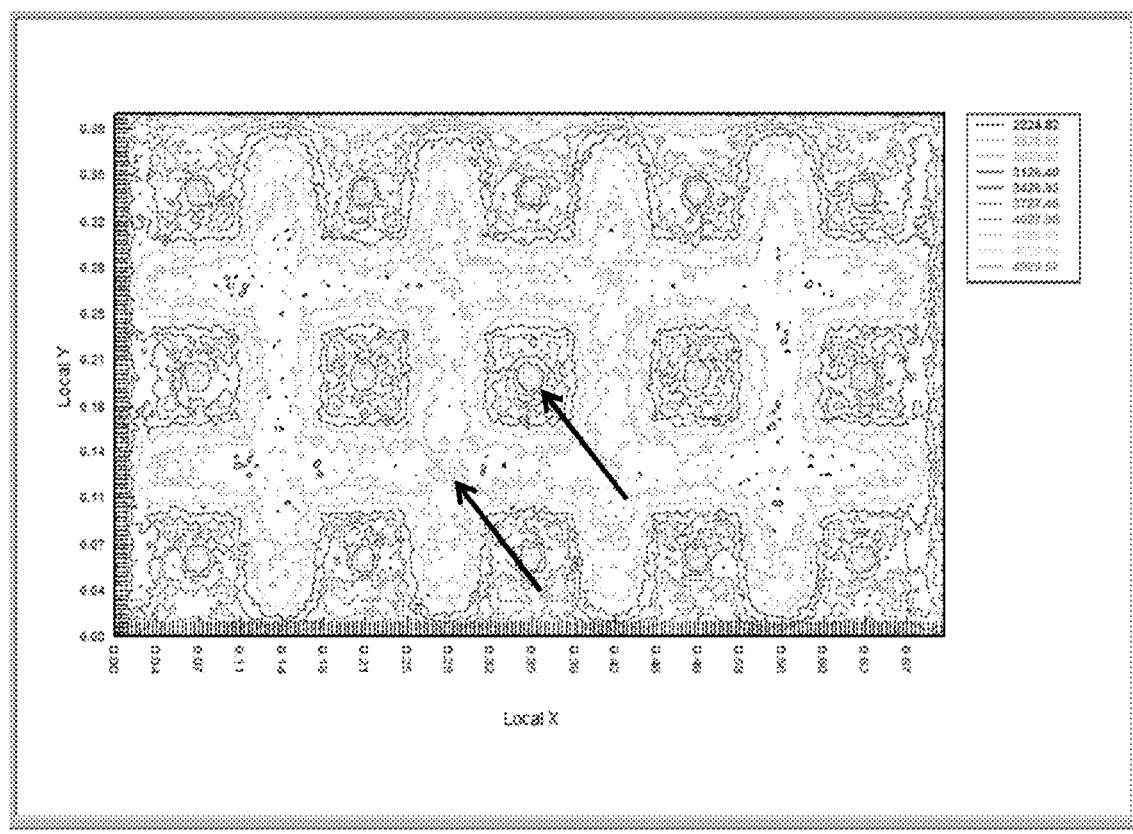
FIG. 23 shows the light pattern of FIG. 22 as a contour illuminance plot.

FIG. 22 shows a light pattern on the outside of the LED backlight unit according to the present exemplary embodiment, when the optical film stack is in place. Illuminance is greater in whiter portions of the light pattern. FIG. 23 shows the light pattern of FIG. 22 as a contour illuminance plot. Here, illuminance is greatest near the right-hand arrow, while illuminance is least near the left-hand arrow. The ratio of maximum to minimum illuminance (between the two arrow points) is about 1.7:1, or about 59% uniformity. The illuminance ratio at the edges of the LED backlight unit is 2.4:1, or about 42% uniformity.

Figure 24:
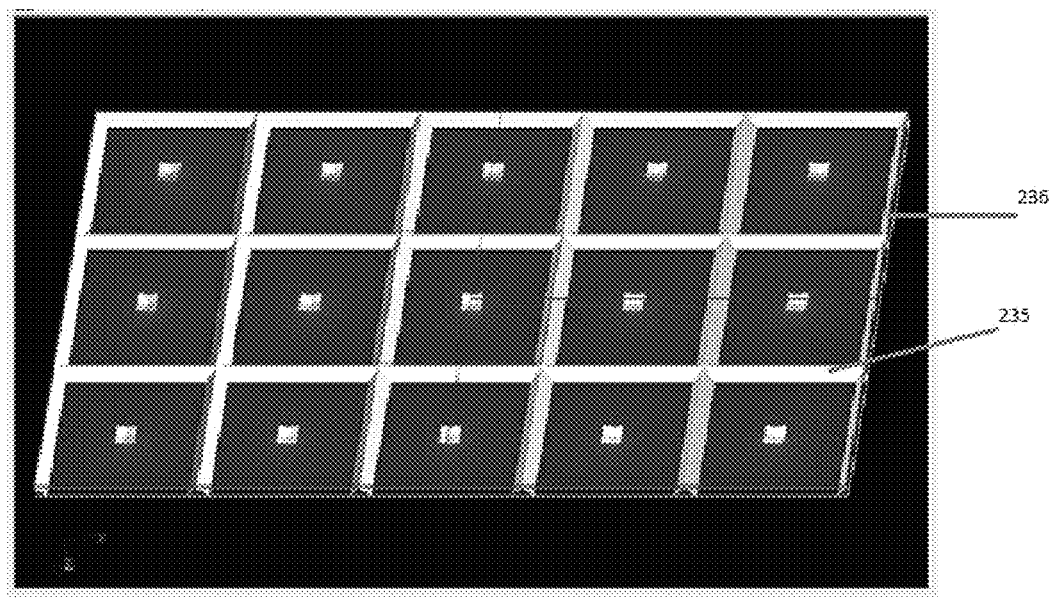
FIG. 24 shows a plan view of an LED backlight unit including the squared cone reflector of FIG. 17 and a tilted edge grid, according to an exemplary embodiment of the present disclosure.

FIG. 24 shows a plan view of an optical sheet including the squared cone reflector 280 of FIG. 17 and a tilted edge grid 235, according to an exemplary embodiment of the present disclosure. According to the present exemplary embodiment, high angle spill light from one LED that would otherwise go more than halfway towards an adjacent LED can be redirected towards the optical film stack. This can be achieved using the edge grid 235 of reflectors between the LEDs, where surfaces of the edge grid 235 may have a 45° tilt.

Figure 25:
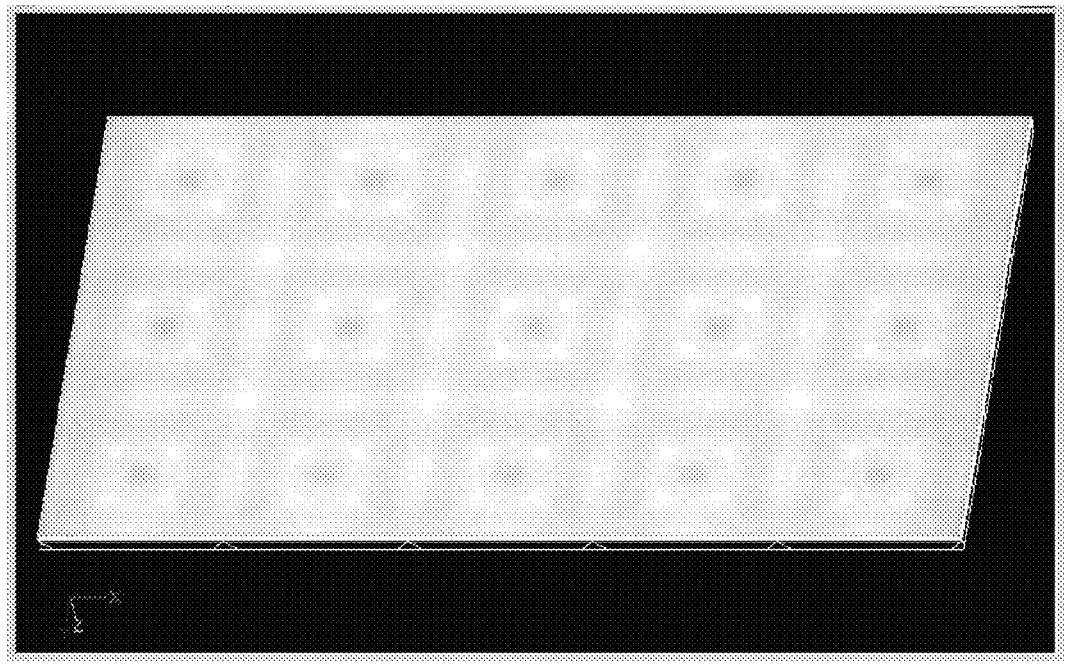
FIG. 25 shows a light pattern on the outside of the LED backlight unit of FIG. 24 with an optical film stack disposed thereon.
Figure 26:
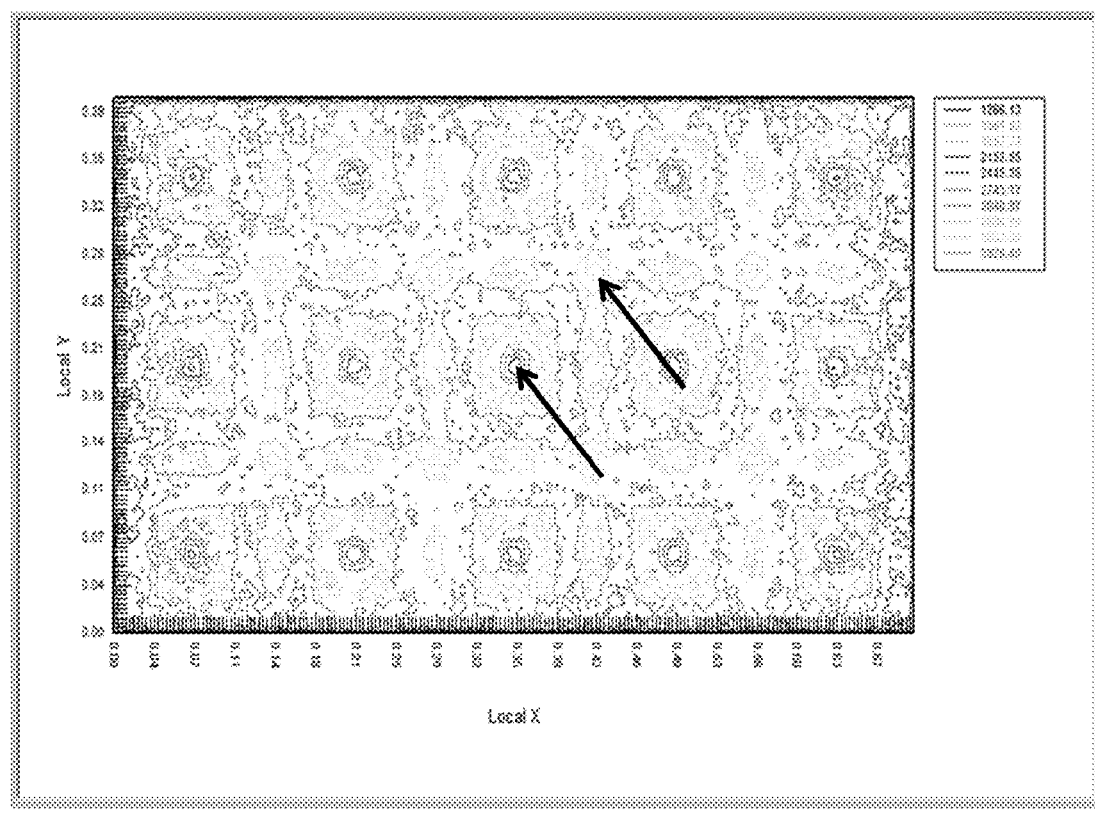
FIG. 26 shows the light pattern of FIG. 25 as a contour illuminance plot.

FIG. 25 shows a light pattern on the outside of the LED backlight unit according to the present exemplary embodiment when the optical film stack is in place. FIG. 26 shows the light pattern of FIG. 25 as a contour plot. Here, illuminance is greatest near the left-hand arrow (in the center of the circle), while illuminance is least near the right-hand arrow. Accordingly, the illuminance ratio between the arrows is 1.7:1, or 59% uniformity. The illuminance ratio of the complete screen, including the edges, is 3.6:1, or about 28% uniformity.

Figure 27:
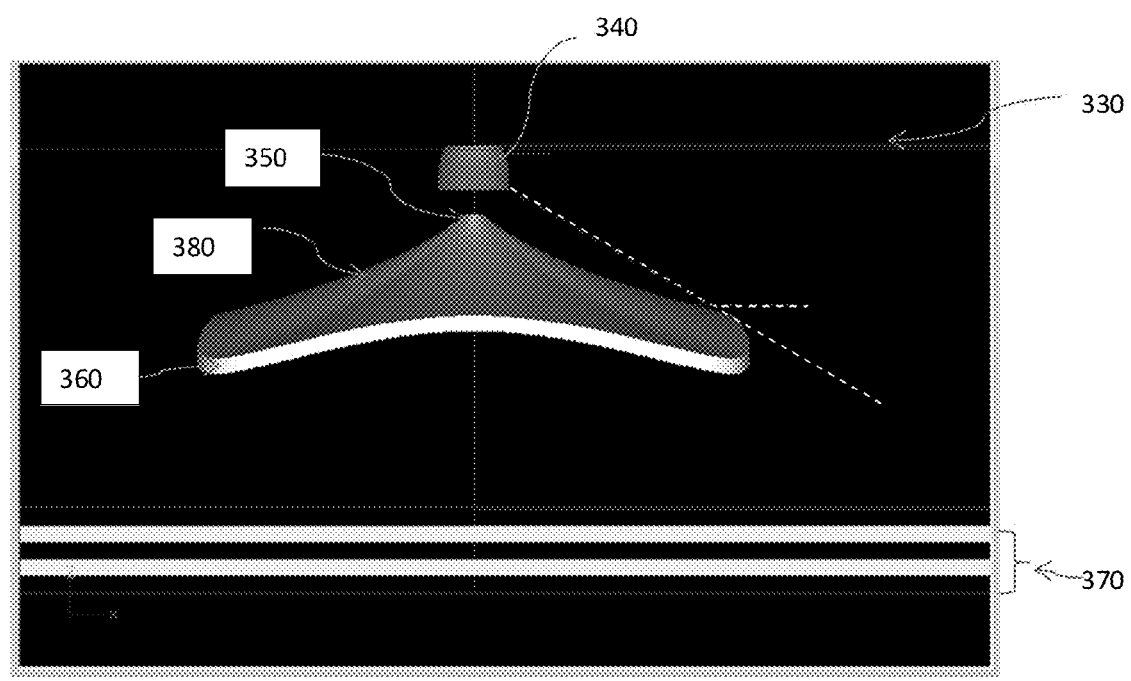
FIG. 27 shows a squared cone reflector according to an exemplary embodiment of the present disclosure.

FIG. 27 shows a portion of an LED backlight unit according to an exemplary embodiment of the present disclosure. The LED backlight unit includes a squared cone reflector 380 having a double reflective geometry, and an LED-enclosing reflector 340 disposed on a PCB 330. The reflector 340 ensures that light leaving an enclosed LED is directed to the squared cone reflector 380 (shown by the diagonal dashed line) to thereby create a desired radiation emission pattern as a function of the power of the LED and the LCD panel geometry. A hole 350 is formed in the tip of the squared cone reflector 380 to reduce decrement in illuminance on the surface of the LCD screen by the squared cone reflector's 380 shadow. The squared cone reflector 380 includes a diffuse reflecting cone front surface 360. The squared cone reflector 380 has a specular reflecting back surface, and the reflecting front surface 360 may be a white reflector. The hole 350 is about 0.5 mm diameter, and the squared cone profile is about 0.5 mm thick. The squared cone reflector 380 is spaced slightly less than 5 mm from the PCB 330, as measured from the horizontal dashed line.

The LED backlight unit also includes an optical film stack 370 including, in sequence, a diffuser, brightness enhancing films (BEFs), and a polarization reflecting film, which may replace one of the BEF films. The optical film stack 370 may condition the light from a diffuse reflecting cavity 305 such that it obtains excellent uniformity as well as a restriction in the field of view that is optimized for the viewer of the LCD display. The PCB 330 is disposed about 7 mm beneath the top surface of the squared cone reflector 380, while the inside of the optical film stack 370 is about 11.5 mm above the PCB 330.

According to the present exemplary embodiment, the squared cone reflector 380 shown in FIG. 27 contains a hole (indicated by solid arrow) at the tip thereof, such that light from the surface of the LED may transverse up the length of the interior of the squared cone reflector 380 to a semi-opaque top surface such that the top most portion of the cone may be partially illuminated by the light coming up through the hole. This hole may have a center diffuser (not shown) placed over it. In a totally internally reflecting (TIR) solution according to another exemplary embodiment, the hole in the cone may be replaced by a small negative lens over the LED. The center diffuser and white front surface 360 of the squared cone reflector 380 help fill in the light directly in front of each optical element. The center diffuser and white front surface 360 allow more light to appear at the center of the illuminance pattern and contribute to the uniformity of light incident on the optical film stack 370.

Figure 28:
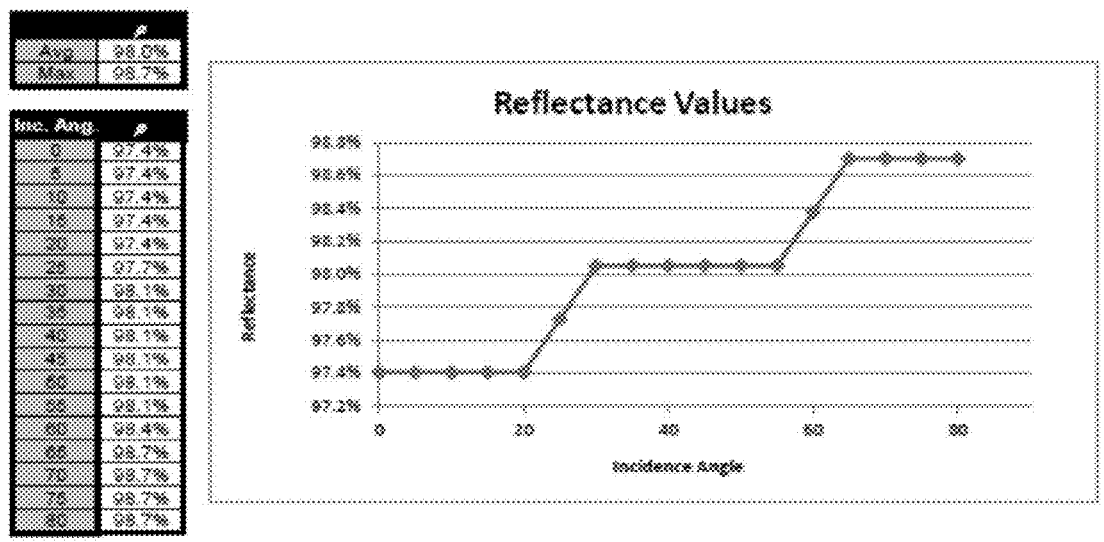
FIG. 28 shows experimentally determined reflectance values according to various incident angles for a highly diffuse material used as the bottom floor of LED BLUs.

FIG. 28 shows the reflectance $\rho$ as a function of the angle of incidence for a white diffusive material used in the various exemplary embodiments of the present disclosure. This material results in a diffusely reflecting cavity for the LCD BLU which may improve the uniformity and optical efficiency of LCD BLU architecture.

Figure 29:
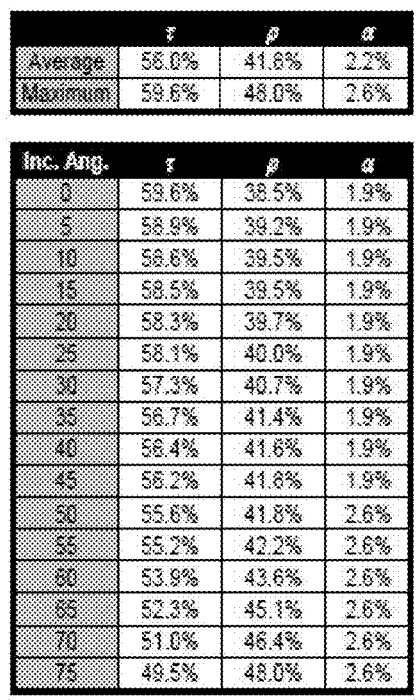
FIG. 29 shows transmittance as a function of angle of a thin diffuser sheet used in LED BLUs.

FIG. 29 shows the experimentally determined transmittance $\tau$, reflectance $\rho$, and absorption $\alpha$ as a function of the angle of incidence for a 0.5 mm thick diffuser material used in an LCD BLU according to an exemplary embodiment of the present disclosure.

Figures 30, 31:
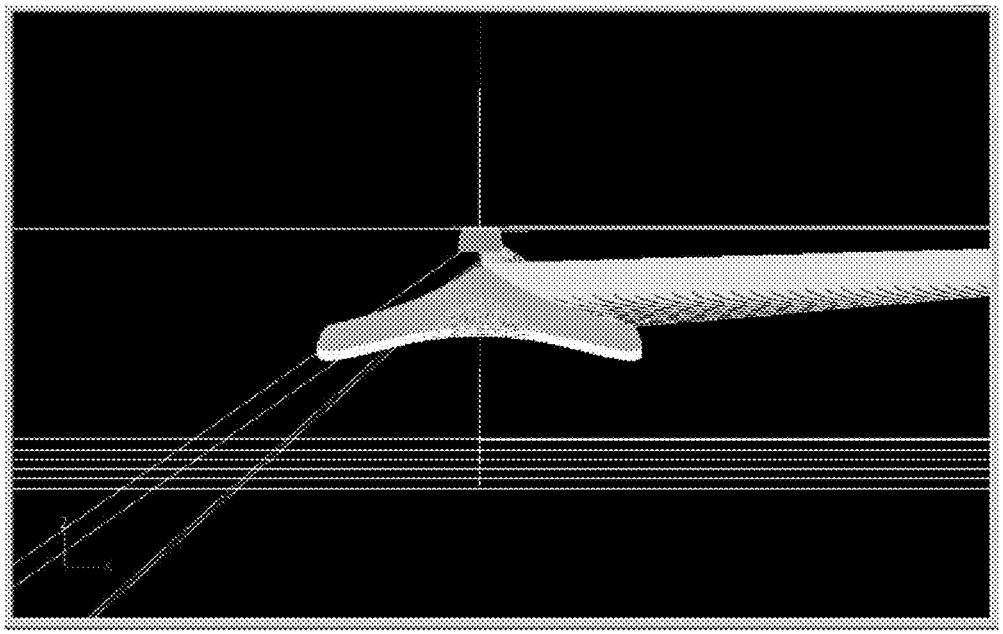
FIG. 30 shows the various material properties used in the modeling of the baffled micro-optical system according to an exemplary embodiment of the present disclosure.
FIGS. 31 and 32 show an extending direction of light away from the squared cone reflector of FIG. 27.

FIG. 30 shows the materials used and the manufacturers of the materials used in the design of the baffled micro-optical elements according to the exemplary embodiments of the present disclosure.

Figure 32:
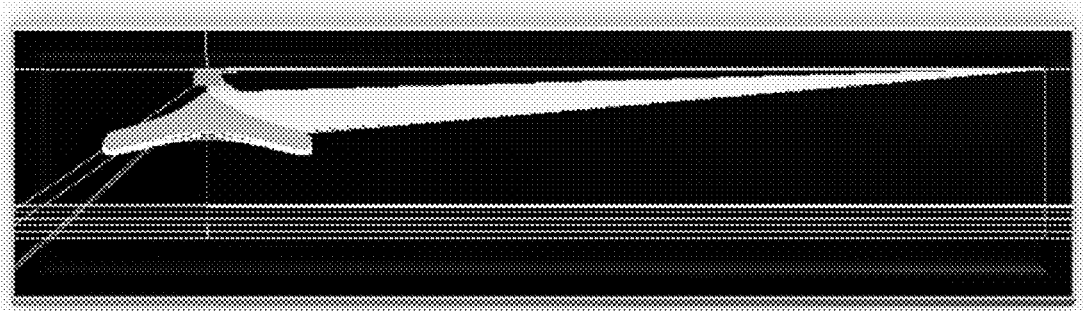

As shown in FIGS. 31 and 32, the lines extending away from the squared cone reflector 380 show the way the squared cone reflector 380 is aimed. The reflector 340 around the base of the LED cross-aims the light onto the squared cone reflector 380. The squared cone reflector 380 aims the light onto the PCB 330, about halfway to an adjacent LED.

Figure 33:
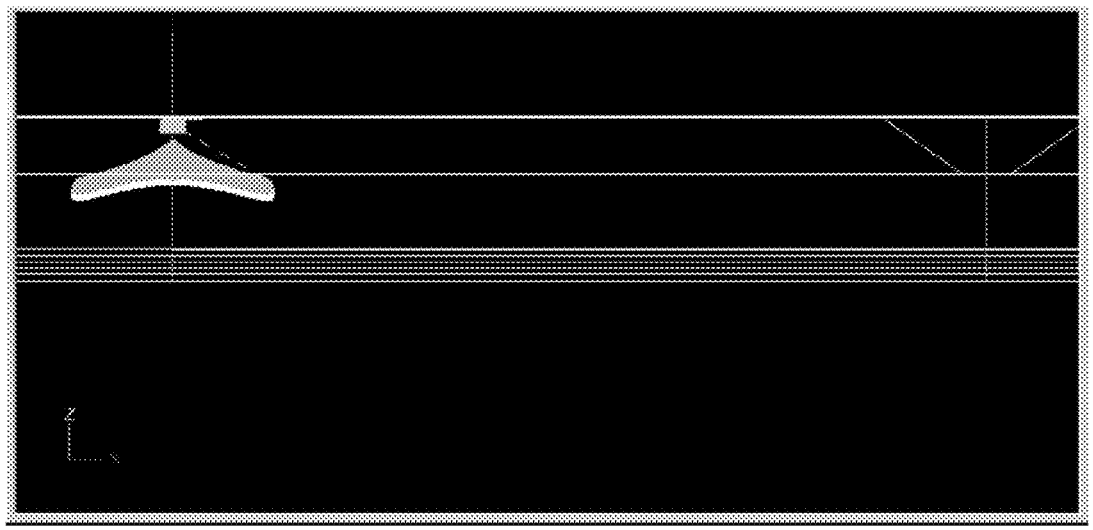
FIGS. 33, 34, and 35 show a cross-sectional view and plan views, respectively, of an LED backlight unit including the squared cone reflector of FIG. 27 and tilted edge grid, according to an exemplary embodiment of the present disclosure.
Figure 34:
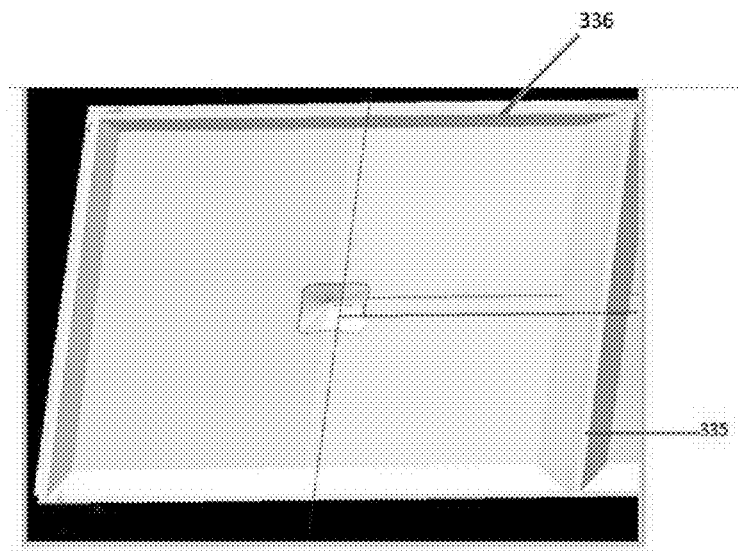
Figure 35:
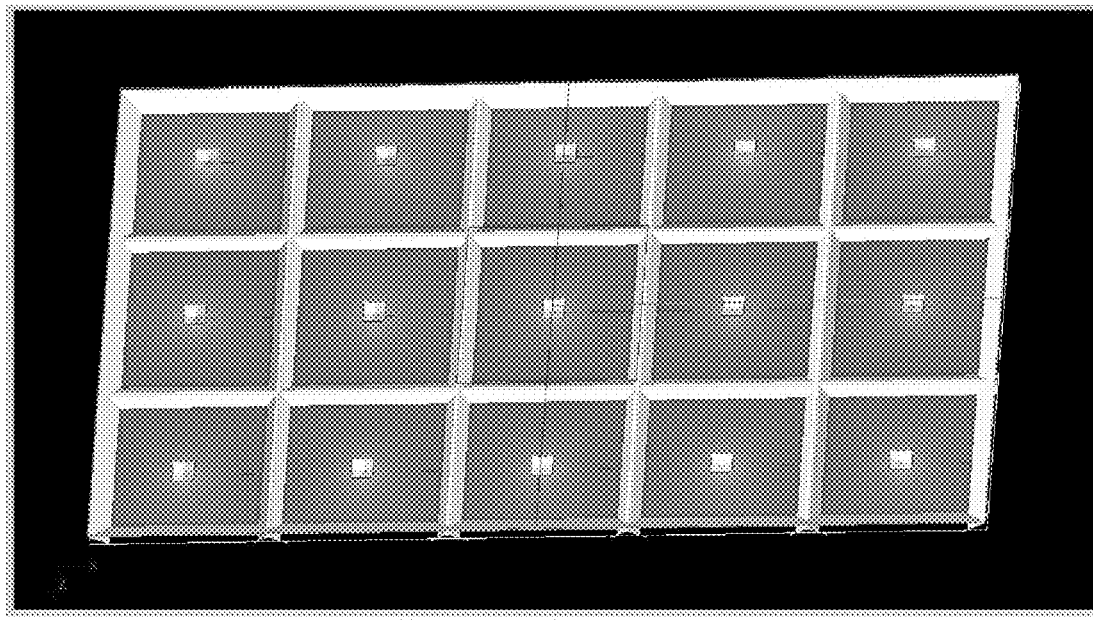

FIGS. 33, 34, and 35 show a cross-sectional view and plan views, respectively, of an optical sheet including the squared cone reflector 380 of FIG. 27 and tilted edge grid 335, according to an exemplary embodiment of the present disclosure. According to the present exemplary embodiment, high angle spill light that would otherwise go too more than halfway towards an adjacent LED can be redirected towards the optical film stack by the edge grid 335. Surfaces of the edge grid 335 may be angled at 45° as shown in FIG. 34, and may be connected to form unit cells 336. These unit cells 336 can be replicated in both the vertical and horizontal directions to enable backlight units of any size to be fabricated with excellent uniformity, as shown in FIG. 35. This can be achieved using a grid of reflectors between the LEDs. The optical film stack is not shown. The reflector grid perimeter has been adjusted to better fill the perimeter of the pattern.

Figure 36:
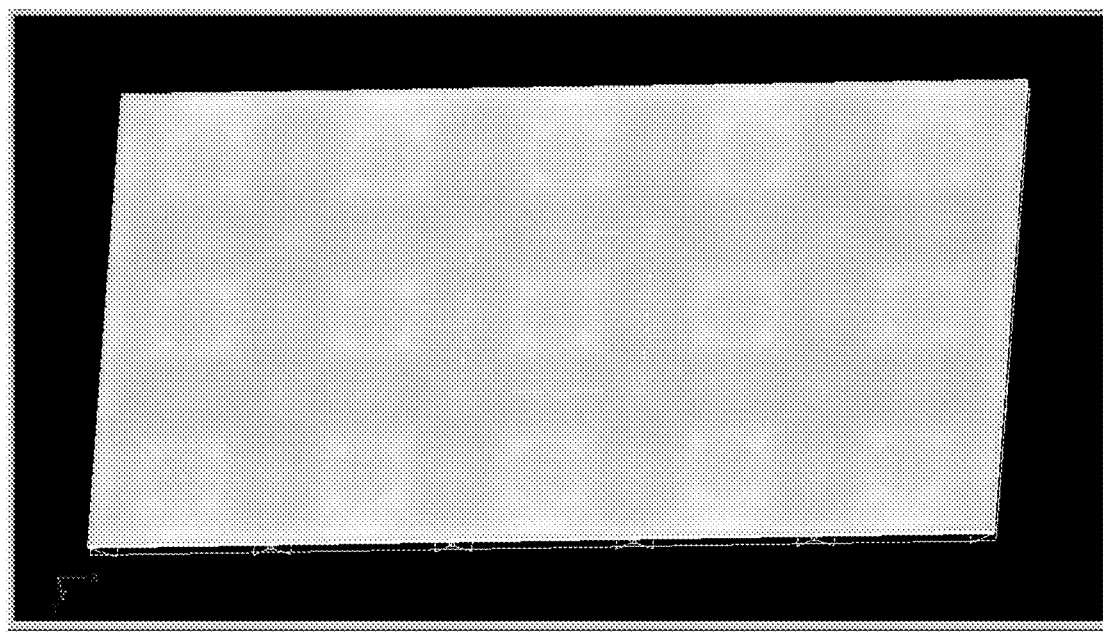
FIG. 36 shows a light pattern on the outside of the LED backlight unit of FIG. 35 with an optical film stack disposed thereon.
Figure 37:
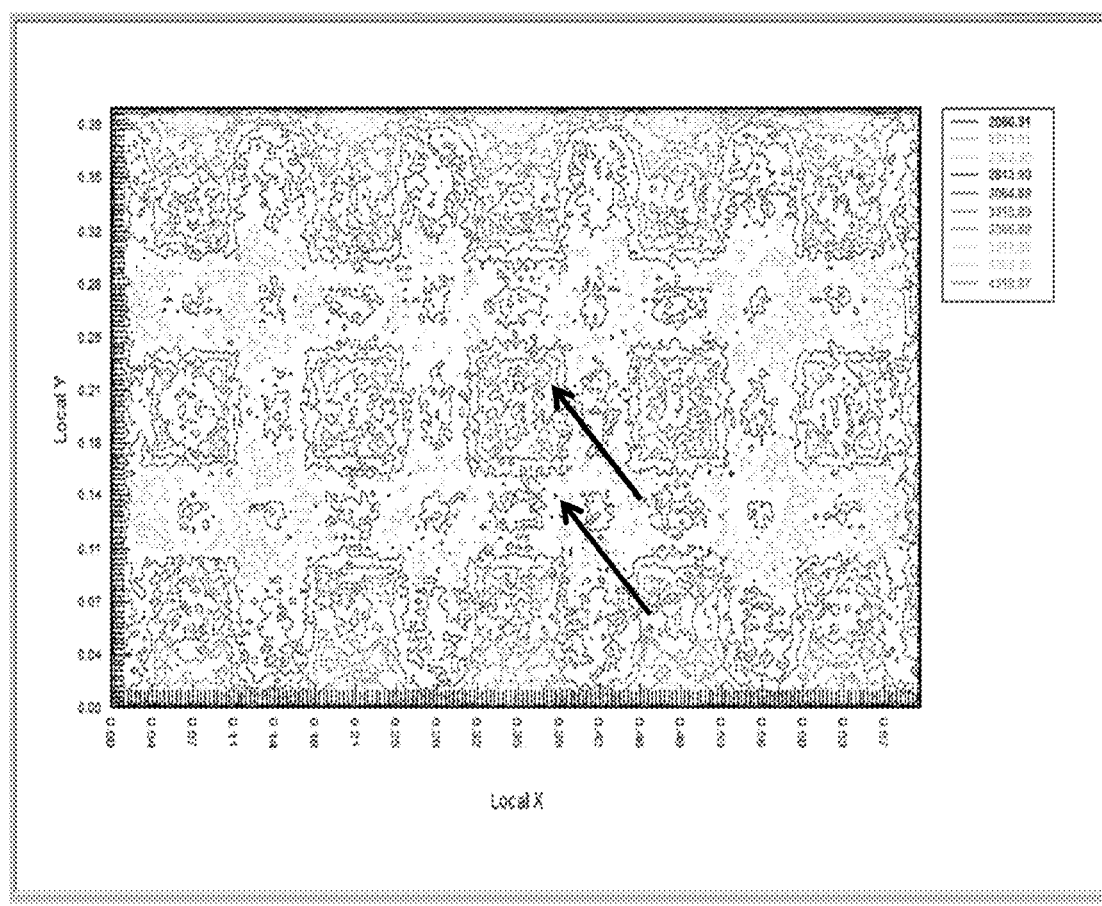
FIG. 37 shows the light pattern of FIG. 36 as a contour illuminance plot.

FIG. 36 shows a light pattern on the outside of the LED backlight unit according to the present exemplary embodiment when the optical film stack is in place. FIG. 37 shows the light pattern of FIG. 36 as a contour illuminance plot. Here, illuminance is greatest near the top arrow, while illuminance is least near the bottom arrow. Accordingly, the ratio of minimum to maximum illuminance in the present exemplary embodiment is 1.4:1, or about 71% uniformity.

It will be apparent to those skilled in the art that various modifications and variation can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A light-emitting diode (LED) backlight unit, comprising:
    a housing;
    a LED array disposed on a bottom surface of the housing, the LED array comprising LEDs;
    an optical film stack disposed on the LED array;
    a baffled micro-optical element (BMOE) disposed between the LED array and the optical film stack, wherein:
    the thickness of the backlight unit is 12 mm or less;
    a first portion of light emitted from each LED of the LED array is configured to directly contact the optical film stack and a second portion of light emitting from each LED of the LED array is configured to be reflected off of the BMOE and onto the optical film stack;
    the first and second portions of light combine to create surface illuminance on the optical film stack with uniformity greater than 70%;
    the BMOE comprises an optical sheet comprising conical reflectors, the conical reflectors are respectively disposed directly over each of the LEDs in a direction substantially perpendicular to a horizontal extending direction of the bottom surface of the housing; and
    each conical reflector comprises:
        a tip being the closest part of the conical reflector to each LED;
        a hole disposed in the tip thereof; and
        a center diffuser disposed in the hole.

2. The LED backlight unit of claim 1, wherein:
    the LED array further comprises a printed circuit board (PCB), on which the LEDs are disposed; and
    the conical reflectors are spaced apart from the PCB.

3. The LED backlight unit of claim 2, wherein each conical reflector comprises a specular reflecting back surface, and a diffusive reflecting front surface.

4. The LED backlight unit of claim 3, wherein the hole in each reflector is about 0.5 mm in diameter.

5. A light-emitting diode (LED) backlight unit, comprising:
    a housing;
    a LED array disposed on a bottom surface of the housing, the LED array comprising LEDs;
    an optical film stack disposed on the LED array;
    a baffled micro-optical element (BMOE) disposed between the LED array and the optical film stack, wherein:
    the thickness of the backlight unit is 12 mm or less;
    a first portion of light emitted from each LED of the LED array is configured to directly contact the optical film stack and a second portion of light emitting from each LED of the LED array is configured to be reflected off of the BMOE and onto the optical film stack;
    the first and second portions of light combine to create surface illuminance on the optical film stack with uniformity greater than 70%;
    the BMOE comprises an optical sheet comprising conical reflectors, the conical reflectors respectively disposed directly over each of the LEDs in a direction substantially perpendicular to a horizontal extending direction of the bottom surface of the housing; and
    each conical reflector comprises:
        a tip being the closest part of the conical reflector to each LED; and
        a negative lens disposed in the tip thereof.

6. The LED backlight unit of claim 1, wherein the optical sheet further comprises an edge grid surrounding each conical reflector to form unit cells.

7. The LED backlight unit of claim 6, wherein the edge grid comprises a pyramidal shape having 45° sides.

8. A light-emitting diode (LED) backlight unit, comprising:
    a housing;
    a LED array disposed on a bottom surface of the housing, the LED array comprising LEDs;
    an optical film stack disposed on the LED array;
    a baffled micro-optical element (BMOE) disposed between the LED array and the optical film stack, wherein:
    the thickness of the backlight unit is 12 mm or less;
    a first portion of light emitted from each LED of the LED array is configured to directly contact the optical film stack and a second portion of light emitting from each LED of the LED array is configured to be reflected off of the BMOE and onto the optical film stack;
    the first and second portions of light combine to create surface illuminance on the optical film stack with uniformity greater than 70%; and the BMOE comprises an optical sheet comprising squared cone reflectors, the squared cone reflectors are respectively disposed directly over each of the LEDs in a direction substantially perpendicular to a horizontal extending direction of the bottom surface of the housing; and each squared cone reflector comprises:
- a tip being the closest part of the squared cone reflector to each LED;
- a hole disposed in the tip thereof; and
- a center diffuser disposed in the hole.

9. The LED backlight unit of claim 8, wherein the LED array further comprises a printed circuit board (PCB), on which the LEDs are disposed; and the squared cone reflectors are spaced apart from the PCB.

10. The LED backlight unit of claim 9, wherein each squared cone reflector comprises a specular reflecting back surface, and a diffusive reflecting front surface.

11. The LED backlight unit of claim 10, wherein the hole in each squared cone reflector is about 0.5 mm in diameter.

12. A light-emitting diode (LED) backlight unit, comprising:
- a housing;
- a LED array disposed on a bottom surface of the housing, the LED array comprising LEDs;
- an optical film stack disposed on the LED array;
- a baffled micro-optical element (BMOE) disposed between the LED array and the optical film stack, wherein:
the thickness of the backlight unit is 12 mm or less;
a first portion of light emitted from each LED of the LED array is configured to directly contact the optical film stack and a second portion of light emitting from each LED of the LED array is configured to be reflected off of the BMOE and onto the optical film stack;
the first and second portions of light combine to create surface illuminance on the optical film stack with uniformity greater than 70%; and
the BMOE comprises an optical sheet comprising squared cone reflectors, the squared cone reflectors are respectively disposed directly over each of the LEDs in a direction substantially perpendicular to a horizontal extending direction of the bottom surface of the housing; and each squared cone reflector comprises:
- a tip being the closest part of the squared cone reflector to each LED; and
- a negative lens disposed in the tip thereof.

13. The LED backlight unit of claim 8, wherein the optical sheet further comprises an edge grid surrounding each squared cone reflector to form unit cells.

14. The LED backlight unit of claim 13, wherein the edge grid comprises a pyramidal shape having 45° sides.

* * * * *